(12) United States Patent
Kato et al.

(10) Patent No.: US 6,956,234 B2
(45) Date of Patent: Oct. 18, 2005

(54) PASSIVE MATRIX DISPLAY DEVICE

(75) Inventors: Kiyoshi Kato, Kanagawa (JP);
Tadafumi Ozaki, Kanagawa (JP);
Kohei Mutaguchi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 172 days.

(21) Appl. No.: 10/305,277

(22) Filed: Nov. 27, 2002

(65) Prior Publication Data
US 2003/0166336 A1 Sep. 4, 2003

(30) Foreign Application Priority Data
Nov. 30, 2001 (JP) ........................................ 2001-367976

(51) Int. Cl.$^7$ .............................................. H01L 29/04
(52) U.S. Cl. ........................................... 257/59; 257/72
(58) Field of Search .............................. 257/59, 66, 72, 257/390

(56) References Cited

U.S. PATENT DOCUMENTS

| | | | |
|---|---|---|---|
| 5,064,275 A | 11/1991 | Tsunoda et al. | |
| 5,317,437 A | 5/1994 | Katakura | |
| 5,627,364 A | 5/1997 | Codama et al. | |
| 5,643,826 A | 7/1997 | Ohtani et al. | |
| 5,870,075 A | 2/1999 | Yamazaki et al. | |
| 5,877,831 A | 3/1999 | Leenhouts et al. | |
| 5,897,187 A | 4/1999 | Aoki et al. | |
| 5,923,962 A | 7/1999 | Ohtani et al. | |
| 6,165,824 A | 12/2000 | Takano et al. | |
| 6,256,080 B1 | 7/2001 | Colgan et al. | |
| 6,285,042 B1 | 9/2001 | Ohtani et al. | |
| 6,469,769 B2 | 10/2002 | Ozaki | |
| 6,613,620 B2 * | 9/2003 | Fujimoto et al. | ............ 438/166 |
| 6,614,076 B2 * | 9/2003 | Kawasaki et al. | ........... 257/350 |
| 6,621,542 B1 | 9/2003 | Aruga | |
| 6,630,907 B1 * | 10/2003 | Ryken et al. | ......... 343/700 MS |
| 6,649,992 B2 | 11/2003 | Lim | |
| 6,714,268 B2 | 3/2004 | Wang et al. | |
| 2002/0079484 A1 * | 6/2002 | Yamazaki et al. | ............. 257/10 |
| 2004/0095548 A1 | 5/2004 | Lim et al. | |

FOREIGN PATENT DOCUMENTS

| | | |
|---|---|---|
| JP | 07-183540 | 7/1995 |
| JP | 10-247735 | 9/1998 |
| JP | 2001-83535 | 3/2001 |

* cited by examiner

*Primary Examiner*—Tuan H. Nguyen
(74) *Attorney, Agent, or Firm*—Eric J. Robinson; Robinson Intellectual Property Law Office, P.C.

(57) ABSTRACT

In a semiconductor device with a reflective passive matrix liquid crystal display mounted thereto, the area for mounting a logic circuit is reduced, the product is reduced in size, and further the reliability is improved. A semiconductor device with a reflective passive matrix liquid crystal display mounted thereto is reduced in size by forming all or some of externally-mounted logic circuits in a region overlapping a pixel region on a substrate where a reflective electrode is formed. The present invention can also reduce the number of IC chips and the like mounted to a substrate greatly and the reliability in mounting IC chips and the like to a substrate can be improved.

58 Claims, 24 Drawing Sheets

PASSIVE MATRIX DISPLAY DEVICE

BACKGROUND OF THE INVENTION

1. Filed of the Invention

The present invention relates to a semiconductor device. In particular, the present invention relates to technology of a semiconductor device having a display unit (hereinafter referred to as an image display unit) that displays images (video and character information), especially of a passive matrix display device.

2. Related Art of the Invention

Semiconductor devices and, particularly, electronic devices having an image display unit (also referred to as a semiconductor display unit because it is a display unit of a semiconductor device) have been vigorously developed in recent years, and their applications can be represented by such portable devices as game devices, laptops, cellular phones as well as such diversities as liquid crystal TVs, liquid crystal displays, EL displays and so on. As compared to the traditional CRTs, the semiconductor display units can be realized in reduced weights, reduced thickness and consuming electric power in small amounts.

As the conventional semiconductor display units, there have been known a semiconductor display unit of the passive matrix type having a pixel region on which striped electrodes are formed in a manner to intersect each other on the upper and lower sides with the liquid crystal layer or light-emitting layer sandwiched therebetween, and a semiconductor display unit of the active matrix type having a pixel region on which thin-film transistors (hereinafter referred to as TFTs) are arranged like a matrix.

FIG. 2, FIGS. 4A and 4B show an example of a configuration of the passive matrix liquid crystal display device that is an example of traditional semiconductor display units. A description of the configuration will be made as follows.

FIG. 4A shows a block diagram of a display unit (a liquid crystal display unit) of the passive matrix liquid crystal display device. The passive matrix liquid crystal display device has a pixel portion 100, a signal line driving circuit 101, and a scanning line driving circuit 102. A signal line 103 connected to the signal line driving circuit 101 and a scanning line 104 connected to the scanning line 102 are crossed to form the pixel portion 100.

FIG. 4B is a configuration figure of the passive matrix liquid crystal display device. A scanning line and a signal line are formed on substrates 105 and 106 respectively. The signal line driving circuit 109 and the scanning line driving circuit 108 are formed and mounted on the different substrate from that forms pixels. FIG. 4B shows that a driver IC in which the signal line driving circuit 109 and the scanning line driving circuit 108 are formed on the silicon substrate is mounted on an FPC 110 using TAB method. There is another method that the driver IC is mounted on the substrate 105 or 106.

FIG. 2 shows that an example of a cross-sectional view of a pixel region of the passive matrix liquid crystal display device. The pixel region of the passive matrix liquid crystal display device is comprised of two glass substrates (a pair of glass substrate) 201 and 208 sandwiching a liquid crystal layer 205, and a polarizing plate 209. In addition, a reflective electrode 207 and an oriented film 206 are formed on the glass substrate. A color filter 202, a transparent electrode 203, and an oriented film 204 are formed on the glass substrate 201. The glass substrates 208 and 201 are arranged so that the reflective electrode 207 and the transparent electrode 203 are crossed each other. The polarizing plate 209 is comprised of a combination the following; a circle polarizing plate, a linear polarizing plate, a retardation film, and the like.

FIG. 2 shows an example of a reflective liquid crystal display device though, a transparent electrode is used instead of the reflective electrode 207 in the case of the transparent liquid crystal display device.

The description of a configuration of electronic devices having the semiconductor display unit will be made with reference to FIG. 3. FIG. 3 shows a simplified block diagram of a portion relates to an image display.

In FIG. 3, a semiconductor device 301 receives or forms image data, processes the image data, converts the format, and has a function of displaying the image. Examples of the semiconductor device 301 include game devices, video cameras, car navigation systems, personal computers and so on.

On the semiconductor device 301, a pixel region 319 is formed on a substrate having an insulating surface, a scanning line drive circuit 318, a signal line drive circuit 317, and other logic circuits are formed on the different silicon substrates respectively and are mounted in the form of IC chips. Some of the circuit blocks may often be formed on the same silicon substrate.

The semiconductor device 301 is constituted by an input terminal 311, a first control circuit 312, a second control circuit 313, a CPU 314, a first memory 315, a second memory 316, and the semiconductor display unit 302. The input terminal 311 receives data that serve as the basis of image data depending upon the kind of the electronic devices. For example, the input data are those through an antenna in the case of a broadcast receiver, and the input data are those from a CCD in the case of a video camera. The input data may be those from a DV tape or a memory card. The data input through the input terminal 311 are converted into image signals through the first control circuit 312. The first control circuit 312 processes the image signals, such as decoding the image data that are compressed and encoded according to the MPEG standard and the tape format, and interpolating and resizing the image. The image signals output from the first control circuit 312 and the image signals formed or processed by the CPU 314, are fed to the second control circuit 313, and are converted into a format (e.g., scanning format, etc.) that is adapted to the semiconductor display unit 302. The second control circuit 313 produces image signals and control signals of which the formats have been converted.

The CPU 314 efficiently controls the signal processing in the first control circuit 312, second control circuit 313 and other interface circuits. The CPU 314 further forms and processes the image data. The first memory 315 is used as a memory region for storing image data from the first control circuit 312 and for storing image data from the second control circuit 313, as a work memory region for executing the control operation by using a CPU, and as a work memory region at the time of forming the image data by the CPU. As the first memory 315, there can be used a DRAM or an SRAM. The second memory 316 stores the color data and character data, and is necessary when the image data are to be formed or processed by the CPU 314. The second memory 316 is constituted by a mask ROM or an EPROM.

The semiconductor display unit 302 is constituted by the signal line driving circuit 317, scanning line drive circuit 318 and pixel region 319. The signal line driving circuit 317 receives image signals and control signals from the second control circuit 313 (clock signals, start pulse signals and the like), and the scanning line driving circuit 318 receives control signals (clock signals, start pulse signals and the like) from the second control circuit 313. The pixel region 319 displays the image.

The electronic device having the semiconductor display unit can assume a variety of constitutions in addition to the constitution shown in FIG. 3. The simplest constitution may comprise the semiconductor display unit, input/output terminals and a simple control circuit as exemplified by a liquid crystal display or an EL display. When the CPU bears a too large load in the architecture shown in FIG. 3, an image processor may be newly provided to reduce the burden of the CPU.

In electronic equipment that has the semiconductor display unit described above, it is often that before being mounted, a driving circuit and a logic circuit are formed on a substrate different from a substrate on which pixels are formed.

Reduction in size of electronic equipment is now an important object to achieve, as the spread of portable electronic equipment becomes clear. In a semiconductor device structured like this, a lot of IC chips are necessary for mounting aside from a substrate on which pixels are formed and therefore it is not easy to reduce the device in size. Even if logic circuits in the IC chips can be made small, the IC chips need a large margin to mount and it still is difficult to reduce the size of the entire device. On the other hand, if the mounting margin is reduced to make the device smaller, a high mounting technique is required and problems arise in terms of cost and reliability of the mounted parts.

SUMMARY OF THE INVENTION

The present invention has been made in view of the above, and an object of the present invention is therefore to provide a semiconductor device having an image display unit that can be reduced in size. Another object of the present invention is to provide a semiconductor device having a passive matrix image display unit that can be reduced in size. Still another object of the present invention is to provide electronic equipment having a semiconductor display unit that can be reduced in size. Still another object of the present invention is to provide electronic equipment having a semiconductor display unit in which defects accompanying mounting of IC chips and the like to a substrate are reduced.

In order to attain the above objects, the present invention provides a passive matrix semiconductor device in which an active element having a transistor function, typically a TFT, is formed in an arbitrary region overlapping a pixel region on a substrate having an insulating surface and the active element constitute a logic circuit. In other words, the present invention is characterized by reducing a passive matrix semiconductor device in size by forming a logic circuit, a signal line driving circuit, and a scanning line driving circuit on a first substrate and forming on a second substrate that faces the first substrate, circuits that are not formed on the first substrate.

As a display device having a TFT formed on a substrate that has an insulating surface, an active matrix display device is known in which a TFT is placed in each pixel. A manufacturing method similar to the one for an active matrix display device can be used to place a TFT in a pixel region of a passive matrix display device where a pixel region does not have a TFT. The present invention is characterized in that a TFT is formed on a substrate having an insulating surface but, unlike an active matrix display device where a TFT is placed in each pixel in order to select and drive a pixel, a logic circuit is formed in an arbitrary region overlapping a pixel region while keeping a passive matrix driving method. This structure is obtained by employing a reflective passive matrix display device and forming a logic circuit below a reflective electrode.

A transmissive semiconductor display device can also be formed if a signal line driving circuit and a scanning line driving circuit are formed on a different substrate from a substrate on which a logic circuit is formed and if the signal line driving circuit and the scanning line driving circuit overlap the logic circuit.

The term logic circuit in the present invention refers to electric circuits in general which are composed of circuit elements such as a transistor, a capacitor element, and a resistor element to have specific functions. A register, a decoder, a counter, a frequency divider circuit, a memory, a control circuit, a CPU, etc. fall within the category of the logic circuit. An electric circuit and a logic circuit have the same meaning here.

When a logic circuit is built from TFTs, preferably TFTs having excellent characteristics in terms of mobility, S value, threshold voltage, and the like are used in order to obtain high operation speed. A method of manufacturing TFTs that have high mobility, in particular, will be described in detail in the following embodiments.

In the present invention, it is preferable to form a light-shielding film to avoid irradiating a TFT with light and degrading its characteristics. The light-shielding film may be formed between a reflective electrode and a TFT or may be formed on an opposite side substrate. The light-shielding film may be omitted if the distance between reflective electrodes is set small.

According to the present invention, a semiconductor device can be reduced in size by forming all or a part of a logic circuit that is external to the device in prior art in a region that overlaps a pixel region on a substrate where a reflective electrode is formed. The present invention also makes it possible to greatly reduce the number of IC chips and the like mounted to a substrate, and thereby solves the reliability problem accompanying mounting of IC chips and the like to a substrate.

DETAILED DESCRIPTION OF THE PREFERRED EMBODIMENTS

Embodiment 1

This embodiment shows as a semiconductor device to which the present invention is applied a passive matrix display device, namely, a semiconductor device having a passive matrix display unit. As a typical mode thereof, a description is given with reference to FIGS. 1A and 1B and FIG. 5 on a device in which a signal line driving circuit, a scanning line driving circuit, and an arbitrary logic circuit with TFTs as its structural components are formed on a first substrate for forming a reflective electrode. A sectional structure of the device is also described.

Figure 1A:
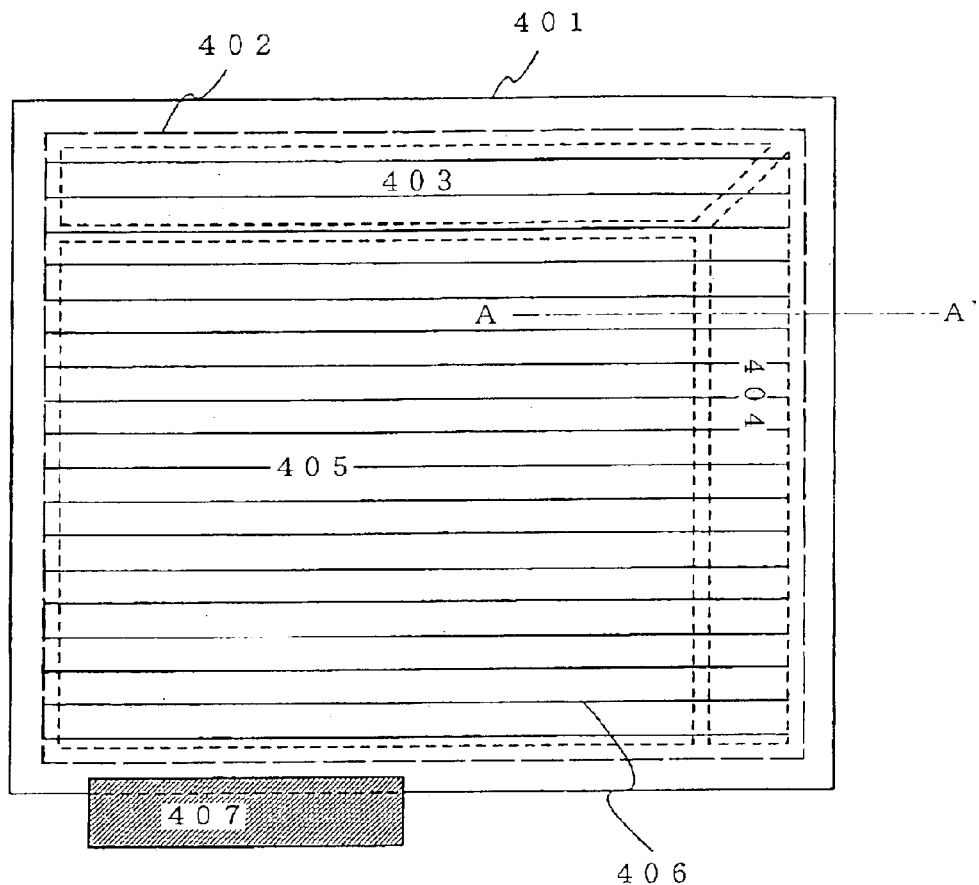
FIGS. 1A and 1B are schematic diagrams of a semiconductor device with a reflective passive matrix liquid crystal display mounted thereto, the display having a logic circuit formed below a pixel region.
Figure 1B:
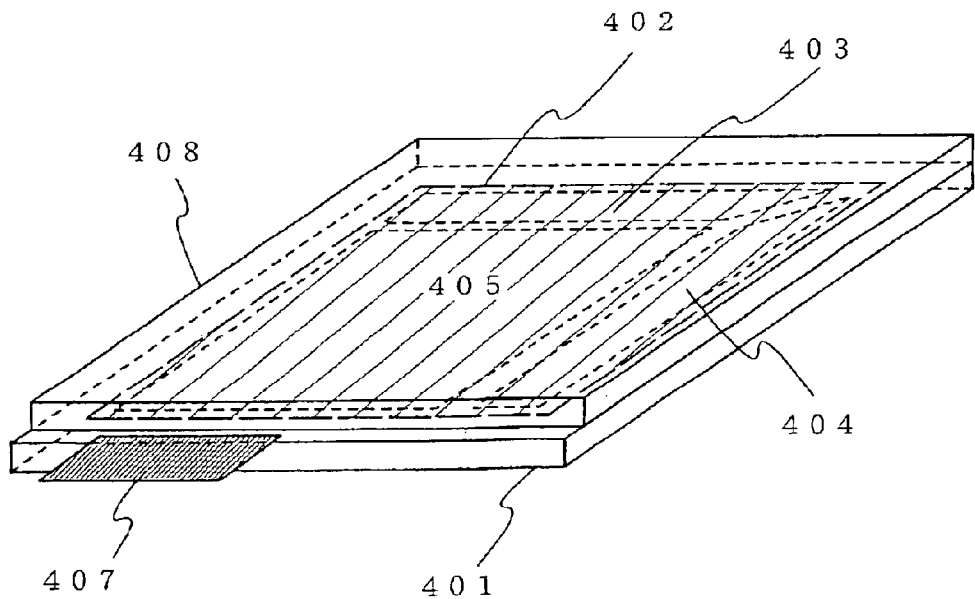

FIGS. 1A and 1B are schematic diagrams of a substrate with reflective electrodes formed thereon which are viewed from above and in perspective, respectively. FIGS. 1A and 1B show the structure of the semiconductor device. In FIGS. 1A and 1B, a signal line driving circuit 404, a scanning line driving circuit 403, and a logic circuit 405 are formed on a substrate 401. Reflective electrodes on the substrate 401 and transparent electrodes on a substrate (opposite substrate) 408 are arranged to form stripe patterns. Thus obtained is a pixel region. The driving circuits and the logic circuit can be formed in an arbitrary region on the substrate 401 that overlaps a pixel region 402.

An output of the signal line driving circuit 404 is connected to signal lines 406 that are the reflective electrodes. The connection can be achieved by any method. In this embodiment, the output is connected directly to the signal lines through a contact hole formed in an interlayer insulating film (See FIG. 5). On the other hand, an output of the scanning line driving circuit 403 is connected to scanning lines (not shown in the drawings) formed on the opposite substrate 408. The connection can be achieved by any method. In this embodiment, a terminal provided in the substrate 401 and a terminal provided in the opposite substrate 408 are connected by an anisotropic conductive film that contains conductive fillers (not shown in the drawings).

Input/output terminals of the logic circuit including the driving circuits are formed on the substrate 401 as needed, and the terminals are connected to other semiconductor parts through an FPC 407. The input/output terminals can be led out of the substrate 401 from any of the four sides of the substrate. Any connection method can be employed.

Although the reflective electrodes in FIGS. 1A and 1B are described as signal lines, the reflective electrodes may be scanning lines. In this case, the connection of the scanning line driving circuit and the connection of the signal line driving circuit are switched. Structures other than the one shown in FIGS. 1A and 1B may be employed, and one or both of the signal line driving circuit and the scanning line driving circuit may be mounted by the TAB method or the like instead of forming them on the substrate 401. A semiconductor device of the present invention can take various modes but the essence of the present invention is in the mode for forming driving circuits and other arbitrary logic circuits in an arbitrary region on a substrate with a reflective electrode formed thereon (on the substrate side) that overlaps a pixel region.

Figure 5:
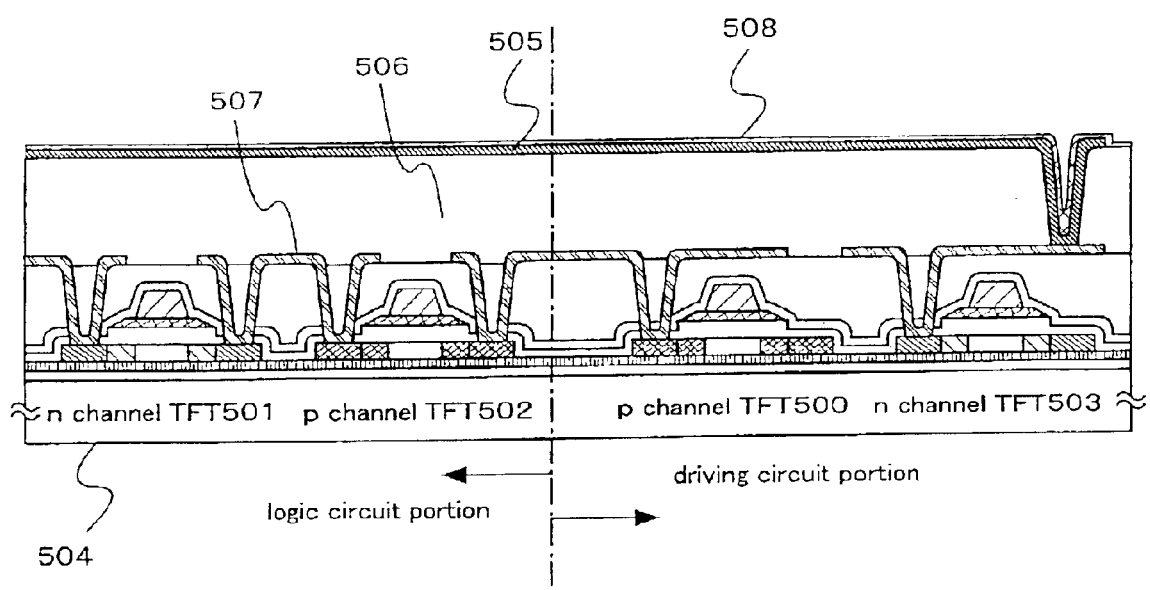
FIG. 5 is a sectional view showing a reflective electrode and TFTs which are formed on the same substrate.

Next, a sectional structure of a semiconductor device of the present invention is described. FIG. 5 is an example of a sectional view obtained by cutting along the line AA' the substrate shown in FIG. 1A on which the reflective electrodes are formed. An opposite substrate on which a liquid crystal layer, color filters, a transparent electrode, an oriented film, and the like are formed, have the same sectional structure as the one shown in FIG. 2, and therefore an explanation thereof is omitted.

In FIG. 5, a logic circuit portion is schematically shown to the left of the dot-dash line and a signal line driving circuit portion is schematically shown to the right of the dot-dash line. In the logic circuit portion, an n-channel TFT 501 and a p-channel TFT 502 are shown as representative elements that are formed on a substrate 504 to constitute the logic circuit. In the driving circuit portion, an n-channel TFT 503 and a p-channel TFT 500 are shown as representative elements that are formed on the substrate 504. A reflective electrode 505 is formed above the TFTs with an interlayer film 506 interposed therebetween. An oriented film 508 is formed on the reflective electrode 505. As shown in a driving circuit output portion, the reflective electrode 505 is connected directly to a wire 507 of the TFT through a contact hole formed in the interlayer film 506. A light-shielding film may be formed between the interlayer film and the reflective electrode (not shown in the drawing). Instead, the light-shielding film may be formed on the opposite side substrate.

In FIG. 5, the TFTs that constitute the driving circuit portion and the TFTs that constitute the logic portion have the same structure but they may have different structures. For instance, if the driving circuit is 16 V driving and other logic circuits are 5 V driving, the TFTs of the driving circuit may have an LDD structure to have a different withstand voltage and a different reliability.

Examples of logic circuits formed in the present invention other than driving circuits include a timing generator (timing generating circuit), an SRAM, a DRAM, an image processing circuit, an interface circuit to communicate with an external device, a CPU, a graphic accelerator, a mask ROM, and DSP or the like.

These logic circuits can be built from n-channel TFTs and p-channel TFTs and therefore may be manufactured by using techniques for forming TFTs on a substrate that has an insulating surface. Some of logic circuits use a resistor element and a capacitor element. In this case, known manufacture techniques can be used to form a resistor element and a capacitor element. For example, an active layer doped with an impurity can be used as a resistor element. A capacitor element which is formed from an active layer, a gate insulating film, and a gate electrode can be used.

Major TFTs formed on glass substrates are ones that use amorphous silicon for their active layers and ones that use polysilicon. From the viewpoint of operation speed of a circuit, it is preferable for a TFT to have high mobility and a TFT using polysilicon is preferred to a TFT using amorphous silicon in building a logic circuit. On the other hand, a TFT using amorphous silicon can be formed at low cost and therefore preferred in a circuit that does not need to operate at high speed.

When a logic circuit is formed on a glass substrate, the operation speed is important in most cases and therefore it is preferable to manufacture a TFT using a process that can provide a TFT having even higher mobility than an ordinary polysilicon TFT. Examples of this process include a semiconductor film crystallization method disclosed in JP 10-247735 A and a crystallization method using a continuous wave laser and shown in the following embodiments.

As described, a semiconductor device of the present invention is characterized in that a logic circuit, which in prior art is formed and mounted on a substrate different from a substrate for forming a reflective electrode, is integrally formed on a substrate for forming a reflective electrode by constituting the logic circuit from TFTs placed in a region that overlaps the reflective electrode with an insulating film interposed therebetween. As a result, a semiconductor device with reduced size can be obtained and the obtained semiconductor device is highly reliable and is greatly simplified in regard to mounting different substrates.
Embodiment 2

In a semiconductor device having a passive matrix display unit in accordance with the present invention, an arbitrary logic circuit can be built on a substrate for forming a reflective electrode. This embodiment describes a semiconductor device of the present invention with reference to FIG. 6.

Figure 6:
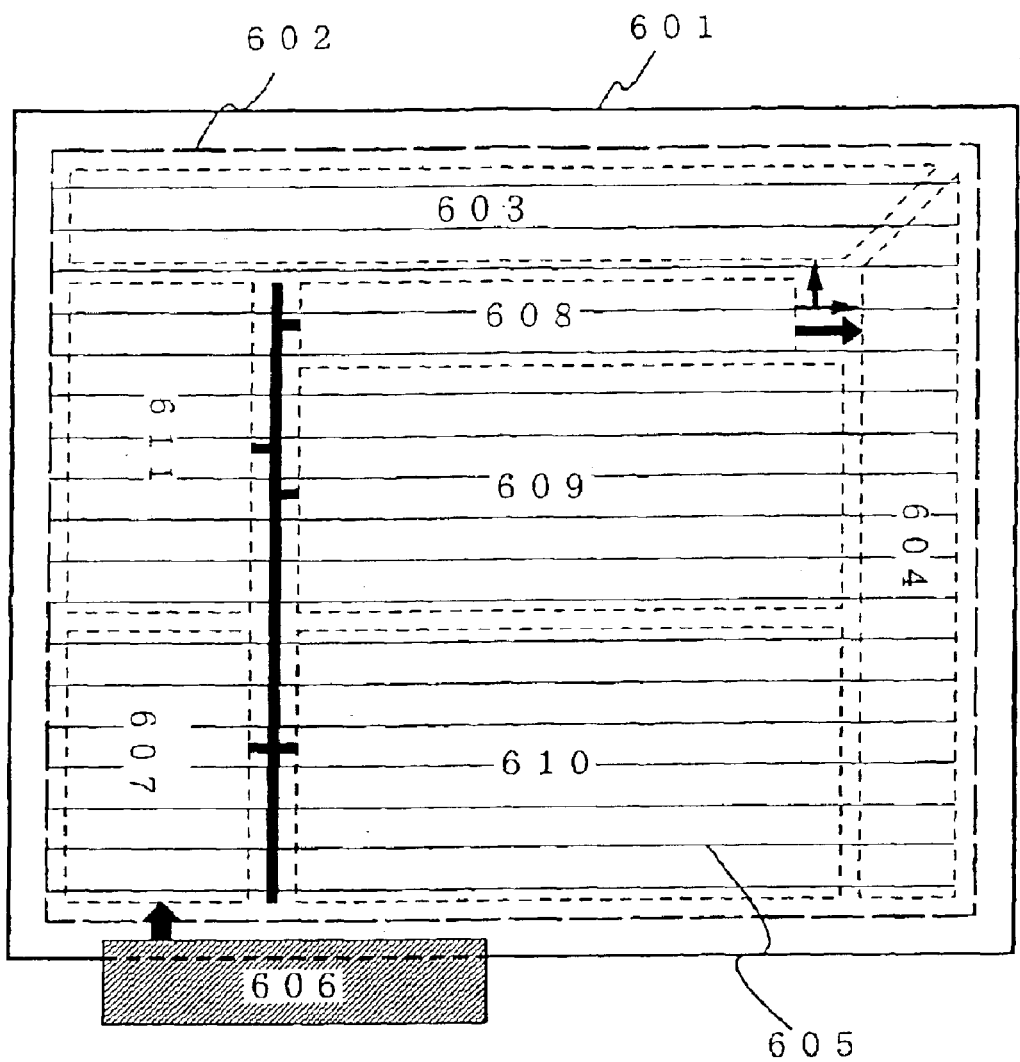
FIG. 6 is a schematic diagram of a device in which an electric circuit is formed below a display.

FIG. 6 is a diagram of a semiconductor device showing a top view of a substrate for forming a reflective electrode. The semiconductor device shown in FIG. 6 has a substrate 601, a pixel region 602, a scanning line driving circuit 603, a signal line driving circuit 604, signal lines 605, and an FPC 606. The semiconductor device shown in FIG. 6 further has a CPU 611, a first control circuit 607, a second control circuit 608, a first memory 609, and a second memory 610 as arbitrary logic circuits. The logic circuits are connected by buses (wires).

Figure 3:
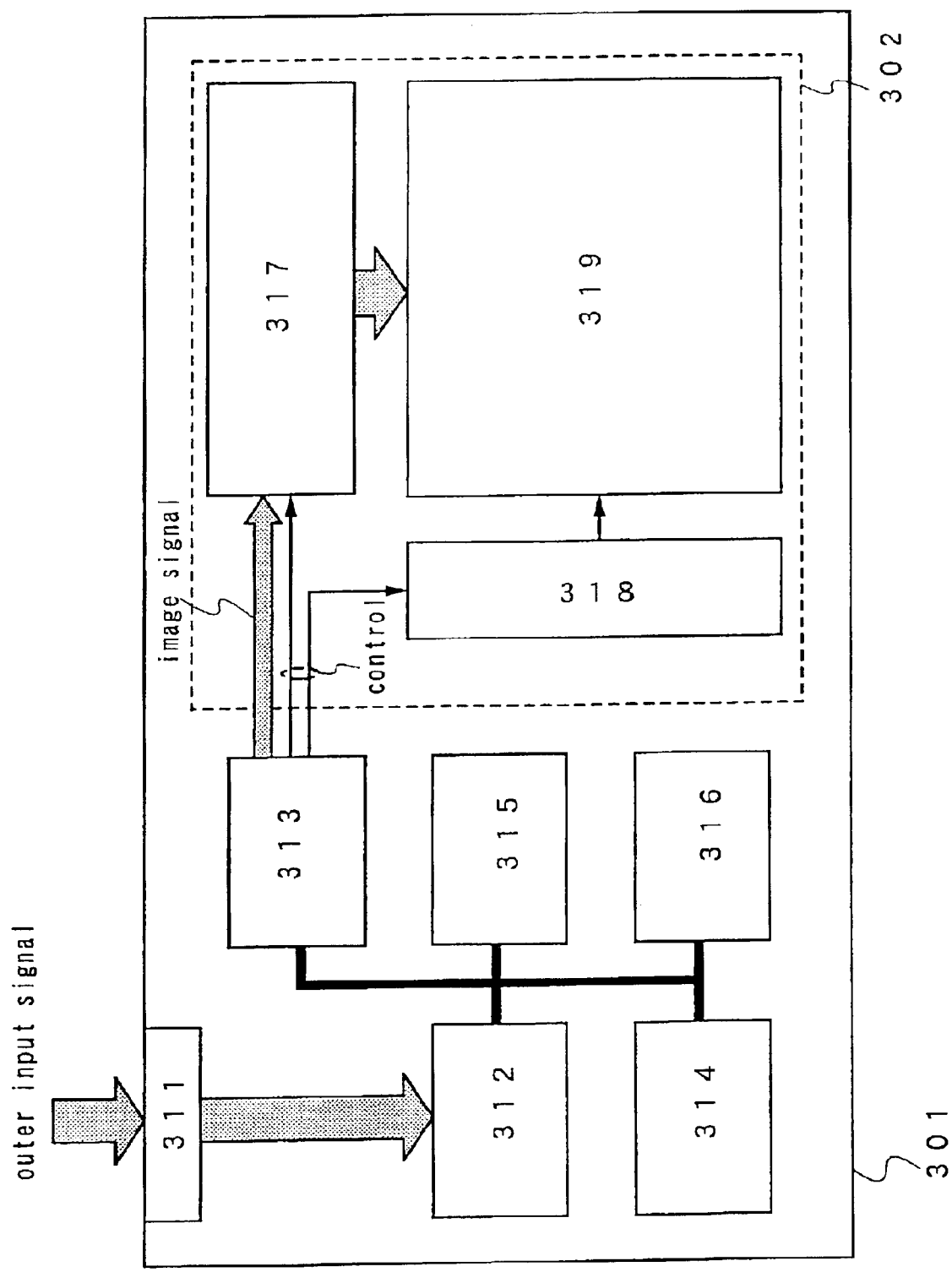
FIG. 3 is a schematic diagram showing an example of a circuit structure of a conventional semiconductor device with a liquid crystal display mounted thereto.
Figure 4A:
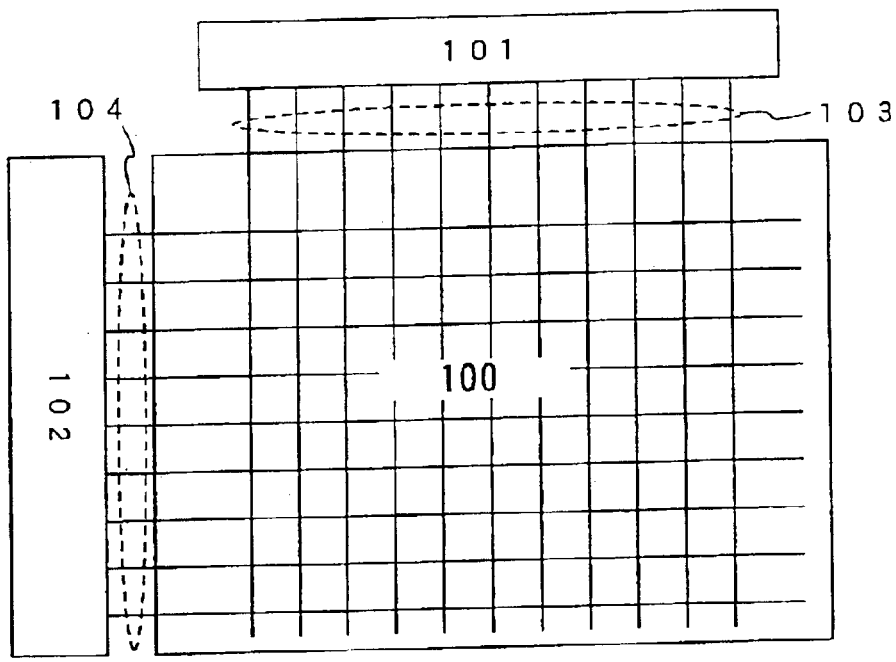
FIGS. 4A and 4B are schematic diagrams showing a pixel region and driving circuits of a conventional passive matrix liquid crystal display device.
Figure 4B:
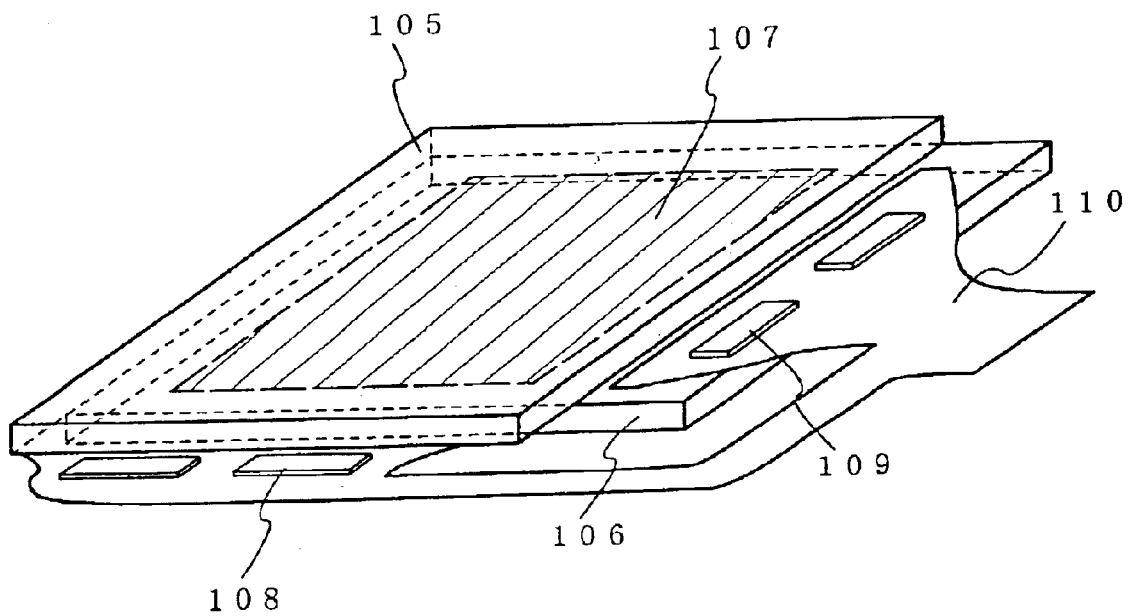

The semiconductor device shown in FIG. 6 is a device that takes in or creates image data, process the image data, and converts the format of the image data to display an image. Since the present invention is characterized by forming at least a logic circuit and a pixel portion on different substrates and the operations and functions of the logic circuit and others are as illustrated in FIG. 3, explanations thereof are omitted in this embodiment.

Arrangement of the logic circuits on the substrate is not limited to the example shown in FIG. 6. Any arrangement can be employed if the block structure is identical to FIG. 6.

A semiconductor device of the present invention can take various structures other than the one shown in FIG. 6. The simplest structure would be to manufacture a driving circuit, an input/output terminal, and a simple control circuit on a substrate for forming a reflective electrode, for example, liquid crystal displays and EL displays. If there is too much load on the CPU in the architecture shown in FIG. 6 as in high-performance game machines, a structure may be employed in which the load of a CPU is lessened by forming an image processor or the like on a substrate for forming a reflective electrode.

In the example shown in this embodiment, all logic circuits are formed on a substrate for forming a reflective electrode. However, only some of logic circuits may be formed on the substrate. For instance, logic circuits that cannot be formed on the substrate due to restrictions on space (area) and operation speed of TFTs may be connected to other IC chips or the like through an FPC or the like.

As described, a semiconductor device of the present invention is superior to conventional devices in size reduction and reliability resulting from simplification of mounted parts. If nearly all of the system can be formed on the substrate, a very small semiconductor device about the same size as the screen size can be obtained.
Embodiment 3

This embodiment describes with reference to FIGS. 7A to 8D a process of manufacturing a logic circuit composed of a CMOS circuit and a passive matrix liquid crystal display on the same substrate.

Figure 7A:
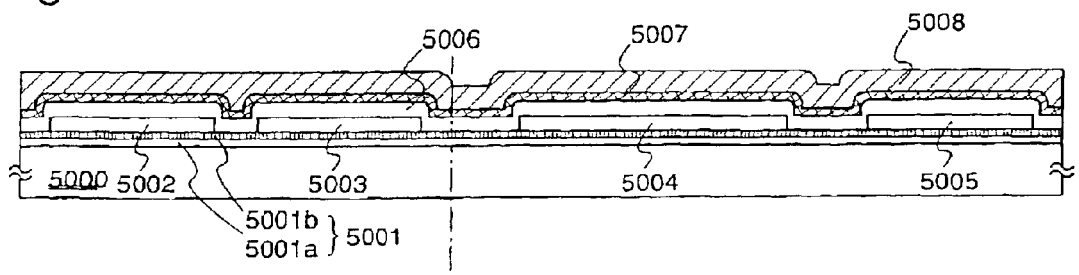
FIGS. 7A to 7D are sectional views showing a process of manufacturing TFTs of a pixel and of a logic circuit.

First, as shown in FIG. 7A, a quartz substrate, silicon substrate, metal substrate, or stainless steel substrate with an insulating film formed on its surface is prepared as a substrate 5000. A plastic substrate may be employed if it has a heat-resistance that can withstand the treatment temperature of this manufacturing process. The substrate 5000 in this embodiment is formed of glass such as barium borosilicate glass or alumino-borosilicate glass.

Next, a base film 5001 is formed on the substrate 5000 from an insulating film such as a silicon oxide film, a silicon nitride film, or a silicon oxynitride film. In this embodiment, a silicon oxynitride film 5001a is formed as a first layer of the base film 5001 by plasma CVD using $SiH_4$, $NH_3$, and $N_2O$ as reaction gas to a thickness of 10 to 200 nm (preferably 50 to 100 nm). The silicon oxynitride film 5001a in this embodiment is 50 nm in thickness. As a second layer of the base film 5001, a silicon oxynitride film 5001b is formed by plasma CVD using $SiH_4$ and $N_2O$ as reaction gas to a thickness of 50 to 200 nm (preferably 100 to 150 nm). The silicon oxynitride film 5001b formed in this embodiment is 100 nm in thickness. Although the base film 5001 in this embodiment has a two-layer structure, it may be a single layer or more than two layers of the above insulating films.

On the base film, a semiconductor film is formed. The semiconductor film is formed by a known method (sputtering, LPCVD, plasma CVD, or the like) to a thickness of 25 to 200 nm (preferably 30 to 150 nm), and is crystallized by laser crystallization. The laser used in laser crystallization is desirably a continuous wave or pulse oscillation solid-state laser, gas laser, or metal laser. Examples of the solid-state laser include a continuous wave or pulse oscillation YAG laser, $YVO_4$ laser, YLF laser, $YAlO_3$ laser, glass laser, ruby laser, alexandrite laser, and Ti: sapphire laser. Examples of the gas laser include a continuous wave or pulse oscillation excimer laser, Ar laser, Kr laser, and $CO_2$ laser. Examples of the metal laser include a continuous wave or pulse oscillation helium cadmium laser, copper steam laser, and gold steam laser. Laser crystallization may be used alone or in combination with other known crystallization methods (such as RTA, a thermal crystallization method using an annealing furnace, or a thermal crystallization method using a metal element that accelerates crystallization).

The semiconductor film can be an amorphous semiconductor film, a microcrystalline semiconductor film, a crystalline semiconductor film, or the like. A compound semiconductor film having an amorphous structure, such as an amorphous silicon germanium film, may also be employed.

In this embodiment, plasma CVD is used to form an amorphous silicon film with a thickness of 50 nm and the amorphous silicon film is subjected to thermal crystallization using a metal that accelerates crystallization and to laser crystallization. Nickel is used as the metal element and is introduced to the top face of the amorphous silicon film by a solvent application method. Then heat treatment is performed on the film at 550° C. for five hours to obtain a first crystalline silicon film. Laser light emitted from a 10 W power continuous wave $YVO_4$ laser is converted into the second harmonic by a non-linear optical element and then formed into a linear beam by an optical system that is shown in any one of the following embodiments 4 through 7. Thus obtained is a second crystalline silicon film. The second crystalline silicon film, which is the first crystalline silicon film irradiated with laser light, is improved in crystallinity. The energy density required here is 0.01 to 100 $MW/cm^2$ (preferably 0.1 to 10 $MW/cm^2$). The stage is irradiated while moving it at a rate of 0.5 to 2000 cm/s relative to the laser light to form the crystalline silicon film. If a pulse oscillation excimer laser is used, it is desirable to set the frequency to 300 Hz and the laser energy density to 100 to 1000 $mJ/cm^2$ (typically 200 to 800 $mJ/cm^2$). In this case, laser light may overlap with each other by 50 to 98%.

Although the first crystalline silicon film can be used to manufacture a TFT, the second crystalline silicon film is more desirable since it is improved in crystallinity and can advance electric characteristics of the TFT. For instance, a TFT formed from the first crystalline silicon film has a mobility of about 300 $cm^2/Vs$ whereas a TFT formed from the second crystalline silicon film has a remarkably improved mobility of 500 to 600 $cm^2/Vs$.

The crystalline semiconductor film thus obtained is patterned by photolithography to form semiconductor layers 5002 to 5005.

After the semiconductor layers 5002 to 5005 are formed, the semiconductor layers may be doped with a minute amount of impurity element (boron or phosphorus) in order to control the threshold of TFTs.

Next, a gate insulating film 5006 is formed to cover the semiconductor layers 5002 to 5005. The gate insulating film 5006 is an insulating film containing silicon and formed by plasma CVD or sputtering to a thickness of 40 to 150 nm. In this embodiment, a silicon oxynitride film with a thickness of 110 nm is formed as the gate insulating film 5006 by plasma CVD. The gate insulating film 5006 is not limited to the silicon oxynitride film and may be a single layer or laminate of other insulating films that contain silicon.

When a silicon oxide film is used as the gate insulating film 5006, the film may be formed by plasma CVD using a mixture of TEOS (tetraethyl orthosilicate) and $O_2$ and setting the reaction pressure to 40 Pa, the substrate temperature to 300 to 400° C., and the high-frequency (13.56 MHz) power density to 0.5 to 0.8 $W/cm^2$ for electric discharge. The silicon oxide film formed by the above process can provide an excel lent characteristic as the gate insulating film 5006 if it is then subjected to thermal annealing at 400 to 500° C.

A first conductive film 5007 with a thickness of 20 to 100 nm and a second conductive film 5008 with a thickness of 100 to 400 nm are layered on the gate insulating film 5006. In this embodiment, on the first conductive film 5007 which is a TaN film with a thickness of 30 nm, the second conductive film 5008 which is a W film with a thickness of 370 nm is laminated.

This embodiment uses sputtering to form the TaN film that is the first conductive film 5007 using a Ta target in an atmosphere containing nitrogen. The W film that is the second conductive film 5008 is formed by sputtering using a W target. The W film may instead be formed by thermal CVD using tungsten hexafluoride ($WF_6$).

Although the first conductive film 5007 is a TaN film and the second conductive film 5008 is a W film in this embodiment, materials for forming the first conductive film 5007 and the second conductive film 5008 are not particularly limited. The first conductive film 5007 and the second conductive film 5008 may be formed of elements selected from the group consisting of Ta, W, Ti, Mo, Al, Cu, Cr, and Nd, or alloy materials or compound materials that contain the elements listed above as major components. The conductive films may also be semiconductor films, typically polycrystalline silicon films, doped with phosphorus or other impurity elements, or AgPdCu alloy films.

Figure 7B:
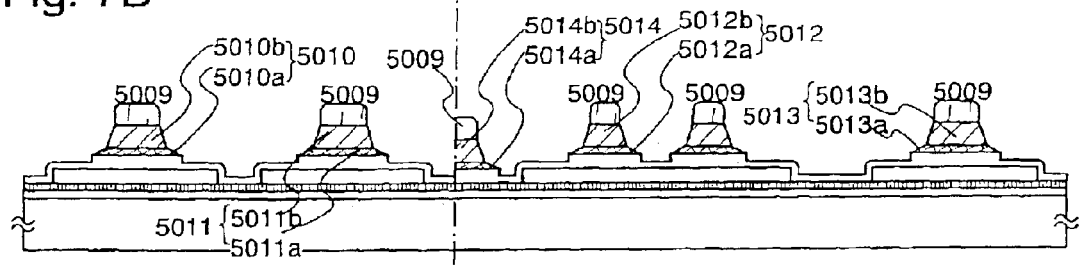

A resist mask 5009 is formed by photolithography to conduct first etching treatment for forming electrodes and wires. The first etching treatment employ first and second etching conditions. (FIG. 7B)

In this embodiment, the first etching conditions include employing ICP (inductively coupled plasma) etching, using $CF_4$, $Cl_2$, and $O_2$ as etching gas, setting the gas flow rate ratio thereof to 25:25:10 (sccm), and giving an RF (13.56 MHz) power of 500 W to a coiled electrode at a pressure of 1.0 Pa to generate plasma for etching. The substrate side (sample stage) also receives an RF (13.56 MHz) power of 150 W so that substantially negative self-bias voltage is applied. The W film is etched under these first etching conditions to taper the first conductive layer 5007 around the edge.

Without removing the resist mask 5009, the first etching conditions are switched to the second etching conditions. The second etching conditions include using $CF_4$ and $Cl_2$ as etching gas, setting the gas flow rate ratio thereof to 30:30 (sccm), and giving an RF (13.56 MHz) power of 500 W to a coiled electrode at a pressure of 1.0 Pa to generate plasma for etching for about 15 seconds. The substrate side (sample stage) also receives an RF (13.56 MHz) power of 20 W so that substantially negative self-bias voltage is applied. The first conductive layer 5007 and the second conductive layer 5008 are etched under the second etching conditions to about the same degree. In order to etch the layers without leaving any residue on the gate insulating film 5006, the etching time may be prolonged by 10 to 20%.

In the above first etching treatment, the first conductive layer 5007 and the second conductive layer 5008 are tapered around the edges by shaping the resist mask properly and by the effect of the bias voltage applied to the substrate side. In this way, first shape conductive layers 5010 to 5014 consisting of the first conductive layer 5007 and the second conductive layer 5008 are formed through the first etching treatment. Regions of the gate insulating film 5006 that are not covered with the first shape conductive layers 5010 to 5014 are etched by 20 to 50 nm to form thinned regions.

Figure 7C:
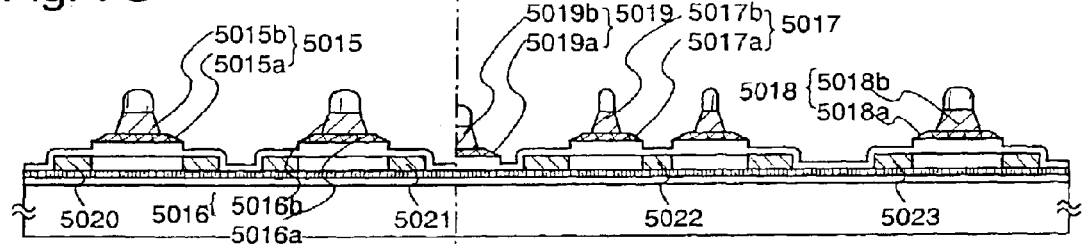
Figure 7D:
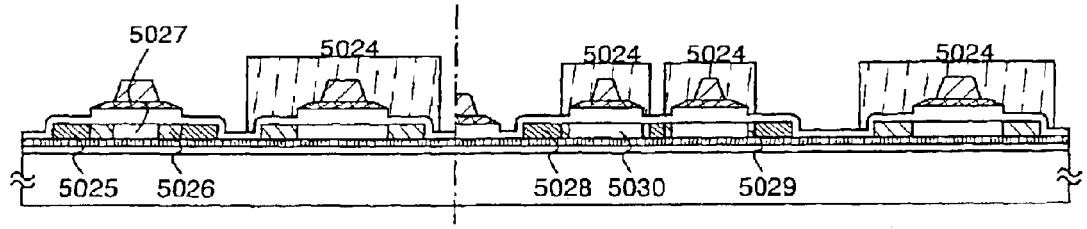

Next, the second etching treatment is conducted without removing the resist mask 5009 (FIG. 7C). In the second etching treatment, $SF_6$, $Cl_2$, and $O_2$ are used as etching gas, the gas flow rate ratio thereof is set to 24:12:24 (sccm), and an RF (13.56 MHz) power of 700 W is given to a coiled electrode at a pressure of 1.3 Pa to generate plasma for etching for about 25 seconds. The substrate side (sample stage) also receives an RF (13.56 MHz) power of 10 W so that substantially negative self-bias voltage is applied. The W film is thus etched selectively to form second shape conductive layers 5015 to 5019. The first conductive layers 5015a to 5018a are hardly etched in the second etching treatment.

Then, without removing the resist mask 5009, the first doping treatment is carried out to dope the semiconductor layers 5002 to 5005 with an impurity element that gives the n type conductivity. The first doping treatment employs ion doping or ion implantation. The ion doping conditions include setting the dose to $1 \times 10^{13}$ to $5 \times 10^{14}$ atoms/$cm^2$ and the acceleration voltage to 40 to 80 keV. In this embodiment, the dose is set to $5.0 \times 10^{13}$ atoms/$cm^2$ and the acceleration voltage is set to 50 keV. An impurity element that gives the n type conductivity is an element belonging to Group 15, typically, phosphorus (P) or arsenic (As). This embodiment employs phosphorus (P). In this case, the second shape conductive layers 5015 to 5018 serve as masks against the impurity element that gives the n type conductivity and first impurity regions (N−regions) 5020 to 5023 are formed in a self-aligning manner. The first impurity regions 5020 to 5023 are doped with the impurity element that gives the n type conductivity in a concentration of $1 \times 10^{18}$ to $1 \times 10^{20}$ atoms/$cm^3$.

Subsequently, the resist mask 5009 is removed and a new resist mask 5024 is formed for the second doping treatment. The acceleration voltage is higher in the second doping treatment than in the first doping treatment. The ion doping conditions include setting the dose to $1 \times 10^{13}$ to $3 \times 10^{15}$ atoms/$cm^2$ and the acceleration voltage to 60 to 120 keV. In this embodiment, the dose is set to $3.0 \times 10^{15}$ atoms/$cm^2$ and the acceleration voltage is set to 65 keV. In the second doping treatment, the second conductive layer 5015b and the resist 5024 are used as masks against the impurity element and the semiconductor layer under the tapered portion of the first conductive layer 5015a and a region of the semiconductor film 5004 that is not covered with any mask are doped with the impurity element. Then the third doping treatment is carried out with the acceleration voltage set lower than in the second doping treatment to obtain the state of FIG. 7D. The ion doping conditions include setting the dose to $1 \times 10^{15}$ to $1 \times 10^{17}$ atoms/$cm^2$ and the acceleration voltage to 50 to 100 keV.

As a result of the above second and third doping treatment, a second impurity region (N−region, Lov region) 5026 overlapping the first conductive layer is doped with an impurity element that gives the n type conductivity in a concentration of $1 \times 10^{18}$ to $5 \times 10^{19}$ atoms/$cm^3$. Third impurity regions (N+regions) 5025 and 5028 are doped with an impurity element that gives the n type conductivity in a concentration of $1 \times 10^{19}$ to $5 \times 10^{21}$ atoms/$cm^3$. Through the first and second doping treatment, regions that are not doped with an impurity element at all or regions doped with a minute amount of impurity element are formed in the semiconductor layers 5002 to 5005. In this embodiment, the regions that are not doped with an impurity element at all or regions doped with a minute amount of impurity element are called channel regions 5027 and 5030. Of the first impurity regions (N−regions) 5020 to 5023 formed through the first doping treatment, there is a region that is covered with the resist 5024 during the second doping treatment. This region is still called as a first impurity region (N−region, LDD region) and denoted by 5029 in this embodiment.

Although the second impurity region (N−region) 5026 and the third impurity regions (N+regions) 5025 and 5028 are formed by the second doping treatment alone in this embodiment, the present invention is not limited thereto. The regions may be formed by plural doping treatment changing the doping treatment conditions suitably.

Figure 8A:
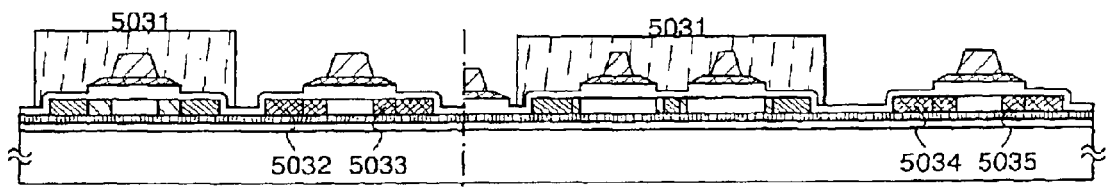
FIGS. 8A to 8D are sectional views showing a process of manufacturing TFTs of a pixel and of a logic circuit.

Next, the resist mask 5024 is removed and a new resist mask 5031 is formed as shown in FIG. 8A. Thereafter the fourth doping treatment is conducted. Through the fourth doping treatment, fourth impurity regions (P+regions) 5032 and 5034 and fifth impurity regions (P−regions) 5033 and 5035 are formed in the semiconductor layers that are to serve as active layers of p-channel TFTs. The fourth and fifth impurity regions are doped with an impurity element that gives the conductivity reverse to the n type conductivity.

In the fourth doping treatment, the second conductive layers 5016b and 5018b are used as masks against the impurity element. In this way, the semiconductor layers are doped with an impurity element that gives the p type conductivity to form the fourth impurity regions (P+regions) 5032 and 5034 and the fifth impurity regions (P−regions) 5033 and 5035 in a self-aligning manner.

The fourth impurity regions 5032 and 5034 and the fifth impurity regions 5033 and 5035 in this embodiment are formed by ion doping using diborane ($B_2H_6$). The ion doping conditions include setting the dose to $1 \times 10^{16}$ atoms/$cm^2$ and the acceleration voltage to 80 keV.

In the fourth doping treatment, the semiconductor layers for forming n-channel TFTs are covered with the resist mask 5031.

The fourth impurity regions (P+regions) 5032 and 5034 and the fifth impurity regions (P−regions) 5033 and 5035 have been doped with phosphorus by the first and the second doping treatment indifferent concentrations. However, any region of the fourth impurity regions (P+regions) 5032 and 5034 and fifth impurity regions (P−regions) 5033 and 5035 is doped, by the fourth doping treatment, with an impurity element that gives the p type conductivity in a concentration of $1 \times 10^{19}$ to $5 \times 10^{21}$ atoms/$cm^2$. Therefore the fourth impurity regions (P+regions) 5032 and 5034 and the fifth impurity regions (P−regions) 5033 and 5035 have no problem in functioning as source regions and drain regions of p-channel TFTs.

Although the fourth impurity regions (P+regions) 5032 and 5034 and the fifth impurity regions (P−regions) 5033 and 5035 are formed by the fourth doping treatment alone in this embodiment, the present invention is not limited thereto. The regions may be formed by plural doping treatment changing the doping treatment conditions suitably.

Figure 8B:
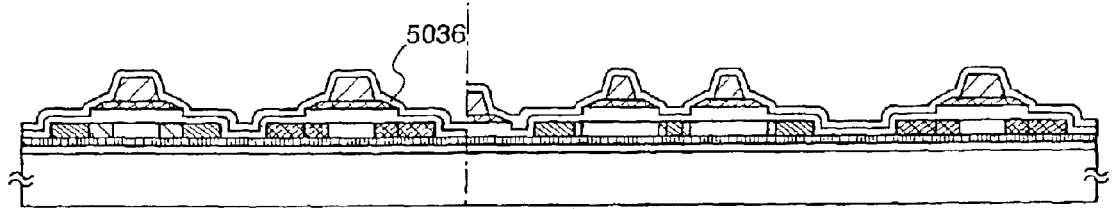

Next, the resist mask 5031 is removed and a first interlayer insulating film 5036 is formed as shown in FIG. 8B. This first interlayer insulating film 5036 is an insulating film containing silicon and is formed by plasma CVD or sputtering to a thickness of 100 to 200 nm. In this embodiment, a silicon oxynitride film is formed by plasma CVD to a thickness of 100 nm. The first interlayer insulating film 5036 is not limited to the silicon oxynitride film but may be a single layer or laminate of other insulating films containing silicon.

Figure 8C:
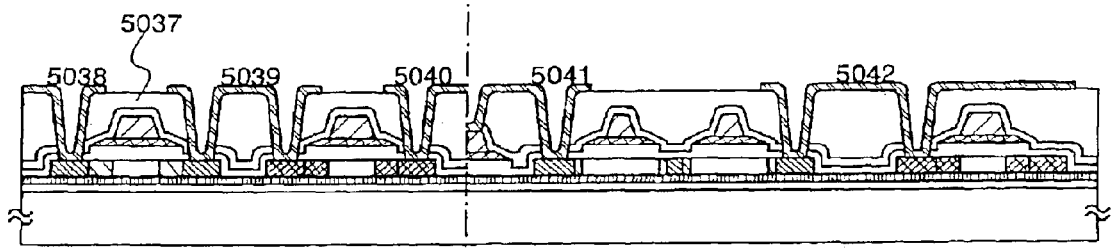

Next, heating treatment (heat treatment) is conducted as shown in FIG. 8C to restore the crystallinity of the semiconductor layers and activate the impurity elements used to dope the semiconductor layers. The heat treatment is achieved by thermal annealing using an annealing furnace. The thermal annealing is conducted in a nitrogen atmosphere with the oxygen concentration set to 1 ppm or less, preferably 0.1 ppm or less, at 400 to 700° C. In this embodiment, the semiconductor layers are subjected to heat treatment at 410° C. for an hour for activation. Other than thermal annealing, laser annealing or rapid thermal annealing (RTA) can be employed.

This heat treatment may be conducted before the first interlayer insulating film 5036 is formed. However, if the materials forming the first conductive layers 5015a to 5019a and the second conductive layers 5015b to 5019b are weak against heat, it is preferred to conduct the heat treatment after the first interlayer insulating film 5036 (an insulating film mainly containing silicon, for example, a silicon nitride film) is formed as in this embodiment to protect the wires and the like.

By putting the heat treatment after formation of the first interlayer insulating film 5036 (an insulating film mainly containing silicon, for example, a silicon nitride film) as described above, hydrogenation of the semiconductor layers is achieved as well as activation. In the hydrogenation process, dangling bonds in the semiconductor layers are terminated by hydrogen contained in the first interlayer insulating film 5036.

Alternatively, heat treatment for activation may be separated from heat treatment for hydrogenation.

The semiconductor layers can be hydrogenated irrespective of presence or absence of the first interlayer insulating film 5036. Examples of alternative hydrogenation means include plasma hydrogenation using hydrogen that is excited by plasma, and heat treatment conducted in an atmosphere containing 3 to 100% of hydrogen at 300 to 450° C. for 1 to 12 hours.

On the first interlayer insulating film 5036, a second interlayer insulating film 5037 is formed. An inorganic insulating film can be used as the second interlayer insulating film 5037. For example, a silicon oxide film formed by CVD or a silicon oxide film applied by SOG (spin on glass) can be employed. The second interlayer insulating film 5037 may be an organic insulating film instead. For example, a polyimide film, a polyamide film, a BCB (benzocyclobutene) film, or an acrylic film can be employed. A laminate of an acrylic film and a silicon oxynitride film may also be used.

In this embodiment, an acrylic film is formed to a thickness of 1.6 μm as the second interlayer insulating film. The second interlayer insulating film 5037 can ease the level difference caused by the TFTs that are formed on the substrate 5000 and level the surface. Since its major role is planarization, a film that can level a surface well is preferred as the second interlayer insulating film 5037.

Next, the second interlayer insulating film 5037, the first interlayer insulating film 5036, and the gate insulating film 5006 are etched by dry etching or wet etching to form contact holes that reach the third impurity regions 5025 and 5028 and the fourth impurity regions 5032 and 5034.

Subsequently, wires 5038 to 5041 and a pixel electrode 5042 are formed to be electrically connected to the respective impurity regions. These wires are formed by patterning a laminate consisting of a 50 nm thick Ti film and a 500 nm thick alloy film (Al—Ti alloy film). The wires are not limited to the two-layer structure and may take a single-layer structure or a multi-layer structure with three or more layers. Wire materials are not limited to Al and Ti. For example, the wires may be formed by patterning a laminate in which an Al film or a Cu film is formed on a TaN film and a Ti film is formed to top them. A desirable wire material is one having excellent reflectivity.

A third interlayer insulating film 5053 is formed next. An inorganic insulating film or an organic insulating film can be used as the third interlayer insulating film. An inorganic third interlayer insulating film may be a silicon oxide film formed by CVD, a silicon oxide film applied by SOG (spin on glass), a silicon nitride film or silicon oxynitride film formed by sputtering, or the like. An organic third interlayer insulating film may be an acrylic resin film or the like.

Examples of a combination of the second interlayer insulating film 5037 and the third interlayer insulating film 5053 are given below.

In one combination example, a laminate of an acrylic film and a silicon nitride film or silicon oxynitride film formed by sputtering is used as the second inter layer insulating film 5037 and a silicon nitride film or silicon oxynitride film formed by sputtering is used as the third interlayer insulating film 5053. In another combination example, a silicon oxide film formed by plasma CVD is used as the second interlayer insulating film 5037 and the third interlayer insulating film 5053 is also a silicon oxide film formed by plasma CVD. In another combination example, a silicon oxide film formed by SOG is used as the second interlayer insulating film 5037 and the third interlayer insulating film 5053 is also a silicon oxide film formed by SOG. In another combination example, a laminate of a silicon oxide film formed by SOG and a silicon oxide film formed by plasma CVD is used as the second interlayer insulating film 5037 and a silicon oxide film formed by plasma CVD is used as the third interlayer insulating film 5053. In another combination example, an acrylic film is used as the second interlayer insulating film 5037 and an acrylic film is also used as the third interlayer insulating film 5053. In another combination example, a laminate of an acrylic film and a silicon oxide film formed by plasma CVD is used as the second interlayer insulating film 5037 and a silicon oxide film formed by plasma CVD is used as the third interlayer insulating film 5053. In another combination example, a silicon oxide film formed by plasma CVD is used as the second interlayer insulating film 5037 and an acrylic film is used as the third interlayer insulating film 5053.

Then a light-shielding film 5052 is formed on a region of the third interlayer insulating film 5053 that includes the logic circuit portion. The light-shielding film 5052 is formed so as to cover the entire lower region of a pixel. Acrylic or other resins can be used as the light-shielding film 5052. Alternatively, metals such as titanium layered on aluminum, or chromium can be used for the light-shielding film. When a metal is used for the light-shielding film, the light-shielding film has to be electrically separated from a reflective electrode 5051 described later by forming an interlayer insulating film on the surface of the metal film or by other methods. Instead of forming the light-shielding film 5052, shielding against light may be achieved by making a colored layer 5049 overlap with another colored layer that has a different color from the layer 5049 in a region where the reflective electrode 5051 described later is not formed or in a region of the pixel excluding the openings. The colored layer 5049 is formed on an opposite substrate and is described later. In this embodiment, forming the light-shielding film 5052 is chosen and an acrylic film is used as the light-shielding film 5052.

Next, the light-shielding film 5052 and the third interlayer insulating film 5053 are etched by dry etching or wet etching to form a contact hole that reaches the pixel electrode 5042.

Then the reflective electrode 5051 is formed on the light-shielding film 5052.

An oriented film 5054 is formed on an area including at least the reflective electrode 5051 and is subjected to rubbing treatment.

An opposite substrate 5046 is prepared next. The colored layer (color filter) 5049 and a planarization film 5055 are formed on the opposite substrate 5046. However, the planarization film 5055 may be omitted if it is not necessary.

Figure 2:
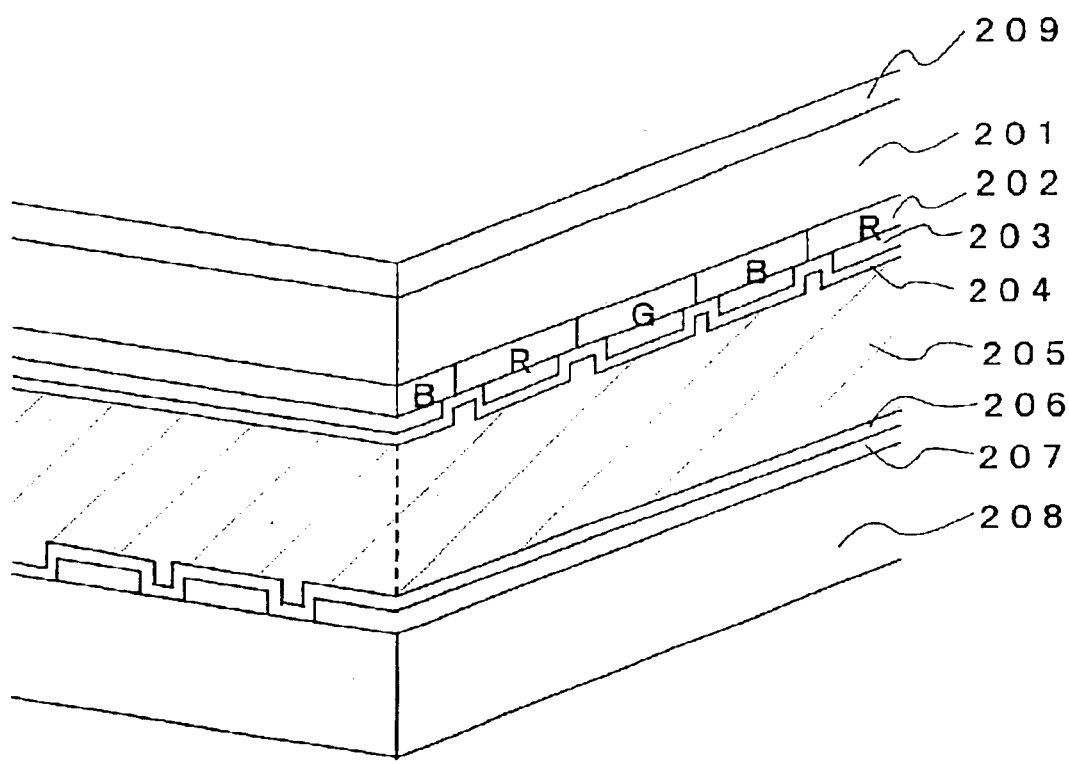
FIG. 2 is a sectional view showing pixels of a reflective passive matrix liquid crystal display device.

On the planarization film 5055, an opposite electrode 5048 is then formed from a transparent conductive film. An oriented film 5047 is formed on the entire surface of the opposite substrate and is subjected to rubbing treatment. The opposite electrode 5048 and the reflective electrode 5051 cross each other forming stripe patterns as shown in FIG. 2.

Figure 8D:
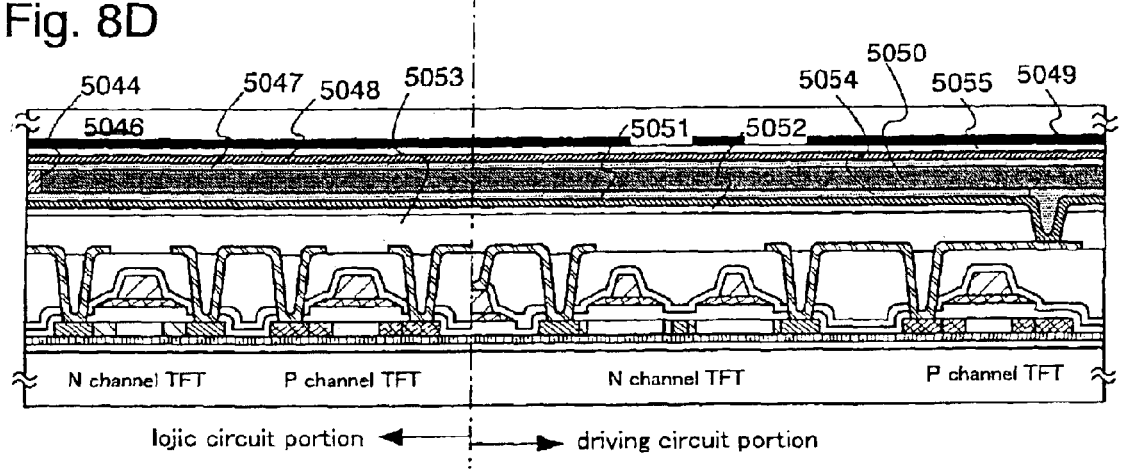

Then the substrate on which the TFTs are formed is bonded to the opposite substrate by a seal member 5044. The seal member 5044 has fillers mixed therein, and the fillers together with columnar spacers keep the distance between the two substrates uniform while they are bonded. Thereafter, a liquid crystal material 5050 is injected to the space between the substrates and the device is completely sealed with an end-sealing agent (not shown in the drawing). As the liquid crystal material 5050, a known liquid crystal material may be used. In this way, a liquid crystal display device shown in FIG. 8D is completed. If necessary, the substrate on which the TFTs are formed or the opposite substrate is cut into desired shapes. When a polarizing plate and an FPC (not shown in the drawing) are bonded, the device is completed as a product.

The semiconductor device manufactured in this embodiment has a logic circuit formed below a pixel region and therefore the product can be reduced in size. The TFTs manufactured in this embodiment may have a bottom gate structure or a dual gate structure.

This embodiment can be combined with other embodiments.

Embodiment 4

This embodiment shows an example of a method for crystallizing a semiconductor film for manufacturing a semiconductor active layer of a TFT (including a channel formation region, source region, and drain region) included in a semiconductor device of the present invention.

As a base film, a silicon oxynitride film (composition ratio: Si=32%, O=59%, N=7%, and H=2%) in 400 nm thick is formed on a glass substrate by plasma CVD method. Then, as a semiconductor film, 150 nm of amorphous silicon film is formed on the base film by plasma CVD method. Then, thermal processing at 500° C. is performed thereon for three hours so that hydrogen contained in the semiconductor film is discharged. After that, the semiconductor film is crystallized by laser annealing method.

As the laser used for laser annealing method, continuous oscillating $YVO_4$ laser is used. For the laser annealing method, the second harmonic (wavelength 532 nm) of the $YVO_4$ laser is used as laser light. As the beam in a predetermined form, laser light is irradiated to the semiconductor film formed on the substrate surface by using an optical system.

The form of the beam irradiated to the substrate can be varied depending on the type of laser or optical system. In this way, the aspect ratio and/or distribution of energy density of the beam irradiated onto the substrate can be changed. For example, various forms of the beam irradiated onto the substrate are possible such as linear, rectangular and elliptical forms. In this embodiment, the second harmonic of the $YVO_4$ laser in an elliptical form of 200 $\mu$m×50 $\mu$m is irradiated to the semiconductor film by using an optical system.

Figure 9:
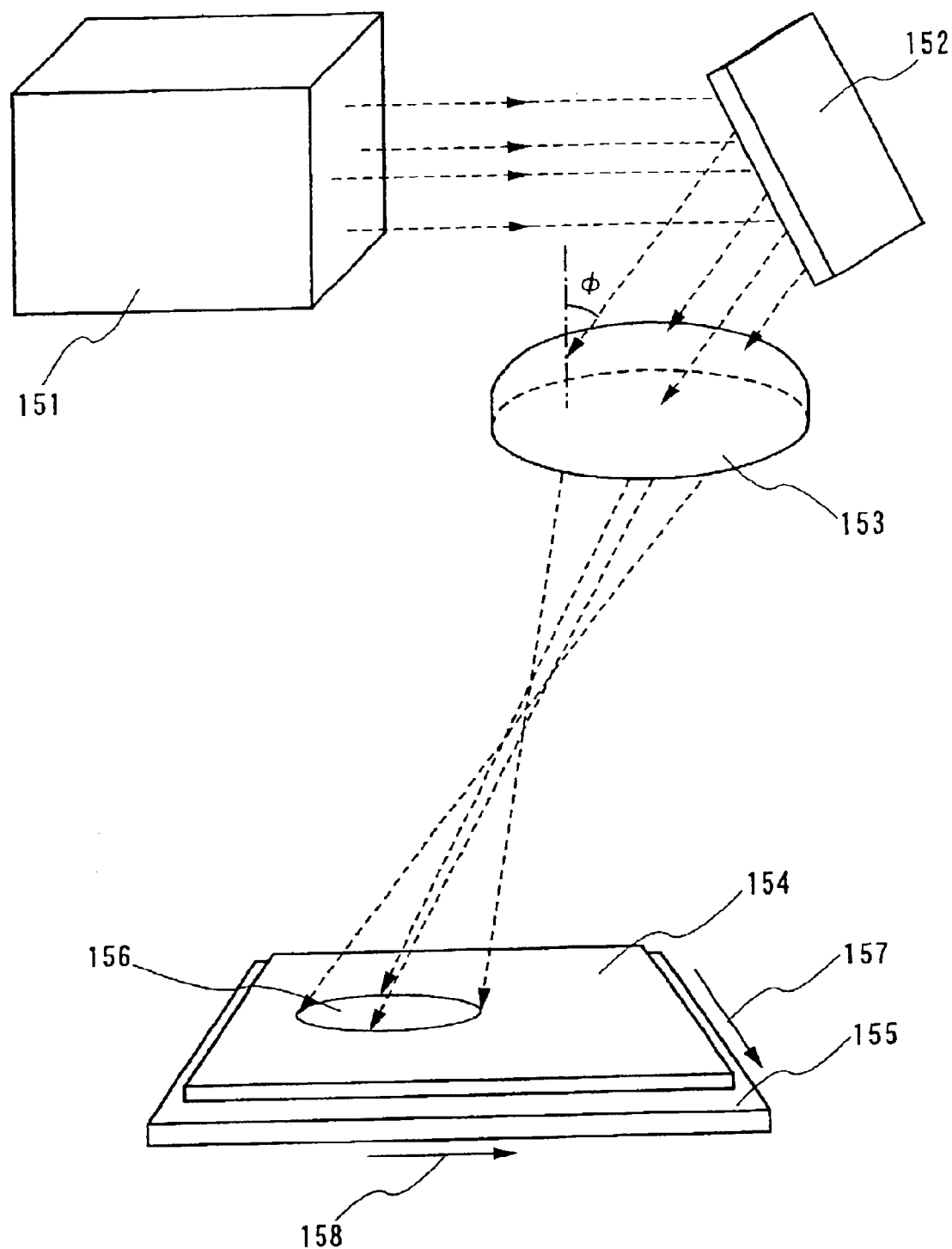
FIG. 9 is a schematic diagram of an optical system used when a semiconductor film formed on a substrate surface is irradiated with laser light.

FIG. 9 shows a model diagram of an optical system, which is used when laser light is irradiated to a semiconductor film on a substrate surface.

Laser light (the second harmonic of $YVO_4$ laser) emitted from a laser 151 enters a convex lens 153 through a mirror 152. The laser light enters to the convex lens 153 diagonally. As a result, a focus position is shifted due to the aberration such as astigmatism. Thus, elliptical beam 156 can be formed in an irradiated surface or near there.

Then, the elliptical beam 156 formed in this way is irradiated, and a glass substrate 155 is moved in a direction indicated by a reference numeral 157 or 158. Then, in the semiconductor film 154 formed on the glass substrate 155, the elliptical beam 156 is irradiated by relatively being moved.

The relative scanning direction of the elliptical beam 156 is perpendicular to the major axis of the elliptical beam 156.

In this embodiment, the elliptical beam of 200 $\mu$m×50 $\mu$m is formed having incident angle $\phi$ of about 20° of laser light with respect to the convex lens 153. The elliptical beam is irradiated on the glass substrate 155 by being moved at the speed of 50 cm/s. Thus, the semiconductor film is crystallized.

Figure 10:
FIG. 10 is an SEM image of a surface of a crystalline semiconductor film.

The seco etching is performed on the crystalline semiconductor film obtained in this way. FIG. 10 shows the result of the observation of the surface by using an SEM with 10,000 magnifications. The seco solution used for the seco etching is manufactured by adding $K_2Cr_2O_7$ as additive to $HF:H_2O=2:1$. One shown in FIG. 10 is obtained by relatively scanning laser light in a direction indicated by an arrow shown in FIG. 10. Large crystal grains are formed in parallel with the scanning direction of the laser light. In other words, the crystal is raised so as to extend in the scanning direction of the laser light.

In this way, large crystal grains are formed on the crystallized semiconductor film by using the method according to this embodiment. Therefore, when the semiconductor film is used as a TFT active layer to manufacture a TFT, the number of the crystal grain boundaries included in the channel forming area of the TFT can be reduced. In addition, each crystal grain internally has crystallinity, which is essentially single crystal. Therefore, the mobility (field effect mobility) as high as that of a transistor using a single crystal semiconductor can be obtained.

Furthermore, when the TFT is positioned such that the direction that the carrier moves can be the same as the direction that the formed crystal grains extend, the number of times that the carriers cross the crystal grain boundary can be extremely reduced. Therefore, a variation in ON current value (value of drain current flowing when the TFT is ON), an OFF current value (value of drain current flowing when the TFT is OFF), a threshold voltage, an S-value and field effect mobility can be reduced. As a result, the electric characteristic can be improved significantly.

In order to irradiate the elliptical beam 156 in a wide range of the semiconductor film, the elliptical beam 156 is scanned in a direction perpendicular to the major axis to irradiate to the semiconductor film multiple times. Here, the position of the elliptical beam 156 is shifted in the direction parallel to the major axis for every single scan. The scanning direction becomes opposite between serial scans. In the serial two scans, one will be called outward scan and the other will be called inward scan hereinafter.

The amount of shifting the position of the elliptical beam 156 to the direction parallel to the major axis for every single scan is expressed by pitch d. A reference numeral D1 indicates, in the outward scan, the length of the elliptical beam 156 in the direction perpendicular to the scanning direction of the elliptical beam 156 in an area having large crystal grains as shown in FIG. 10. A reference numeral D2 indicates, in the inward scan, the length of the elliptical beam 156 in the direction perpendicular to the scanning direction of the elliptical beam 156 in an area having large crystal grains as shown in FIG. 10. In this case, an average value of D1 and D2 is D.

Here, an overlap ratio $R_{O,L}$ [%] is defined by Equation 1.

$$R_{O,L} = (1-d/D) \times 100 \quad \text{[Equation 1]}$$

In this embodiment, the overlap ratio $R_{O,L}$ is 0%.

Embodiment 5

This embodiment is different from the Embodiment 4 in the method for crystallizing a semiconductor film when an active layer of a TFT included in the semiconductor device of the present invention is manufactured.

The steps up to forming an amorphous silicon film as a semiconductor film are the same as those of the Embodiment 4. After that, the method disclosed in Japanese Patent Application Laid-open No. Hei 7-183540 is used. Nickel acetate solution (5 ppm in weight conversion concentration and 10 ml in volume) is coated on the semiconductor film by spin coating method. Then, thermal processing is performed thereon in a nitrogen atmosphere at 500° C. for one hour and in a nitrogen atmosphere at 550° C. for twelve hours. Then, the crystallinity of the semiconductor film is improved by laser annealing method.

As the laser used for laser annealing method, continuous oscillating $YVO_4$ laser is used. For the laser annealing method, the second harmonic (wavelength 532 nm) of the $YVO_4$ laser is used as laser light. The elliptical beam of 200 $\mu m \times 50$ $\mu m$ is formed having incident angle $\phi$ of about 20° of laser light with respect to the convex lens 153 in the optical system shown in FIG. 9. The elliptical beam is moved and irradiated to the glass substrate 155 at the speed of 50 cm/s. Thus, the crystallinity of the semiconductor film is improved. The relative scanning direction of the elliptical beam 156 is perpendicular to the major axis of the elliptical beam 156.

Figure 11:
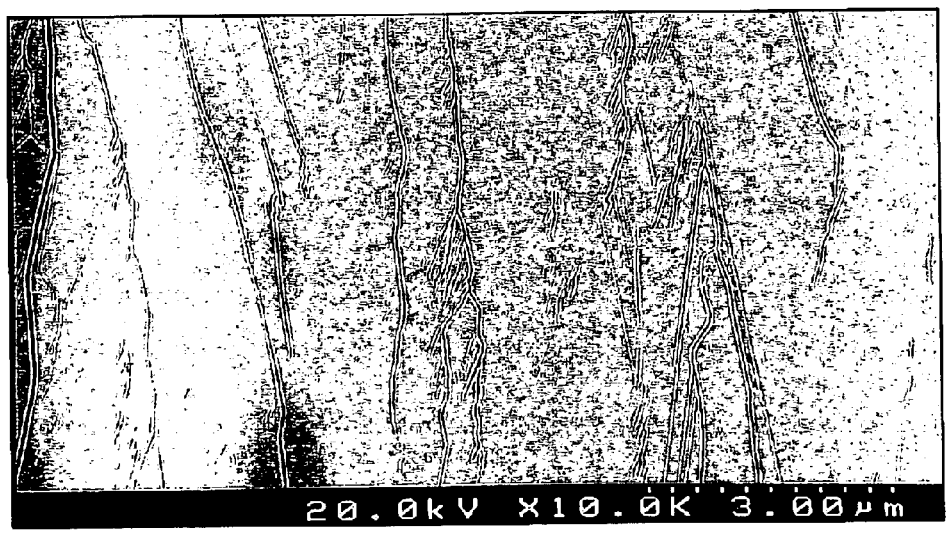
FIG. 11 is an SEM image of a surface of a crystalline semiconductor film.
Figure 11:

The seco etching is performed on the crystal line semiconductor film obtained in this way. FIG. 11 shows the result of the observation of the surface by using an SEM with 10,000 magnifications. One shown in FIG. 11 is obtained by relatively scanning laser light in a direction indicated by an arrow shown in FIG. 11. Large crystal grains extend in the scanning direction.

In this way, large crystal grains are formed on the crystallized semiconductor film according to the present invention. Therefore, when the semiconductor film is used to manufacture a TFT, the number of the crystal grain boundaries included in the channel forming area of the TFT can be reduced. In addition, each crystal grain internally has crystallinity, which is essentially single crystal. Therefore, the mobility (field effect mobility) as high as that of a transistor using a single crystal semiconductor can be obtained.

Furthermore, the formed crystal grains are aligned in one direction. Thus, when the TFT is positioned such that the direction that the carriers move can be the same as the direction that the formed crystal grains extend, the number of times that the carriers cross the crystal grain boundary can be extremely reduced. Therefore, a variation in ON current value, an OFF current value, a threshold voltage, an S-value and field effect mobility can be reduced. As a result, the electric characteristic can be improved significantly.

In order to irradiate the elliptical beam 156 in a wide range of the semiconductor film, the elliptical beam 156 is scanned in a direction perpendicular to the major axis to irradiate to the semiconductor film multiple times (this operation may be called scan). Here, the position of the elliptical beam 156 is shifted in the direction parallel to the major axis for every single scan. The scanning direction becomes opposite between continuous scans. As same in Embodiment 4, in the continuous two scans, one will be called outward scan and the other will be called inward scan hereinafter.

The amount of shifting the position of the elliptical beam 156 to the direction parallel to the major axis for every single scan is expressed by pitch d. A reference numeral D1 indicates, in the outward scan, the length of the elliptical beam 156 in the direction perpendicular to the scanning direction of the elliptical beam 156 in an area having large crystal grains as shown in FIG. 11. A reference numeral D2 indicates, in the inward scan, the length of the elliptical beam 156 in the direction perpendicular to the scanning direction of the elliptical beam 156 in an area having large crystal grains as shown in FIG. 11. In this case, an average value of D1 and D2 is D.

Here, an overlap ratio $R_{O,L}$ [%] is defined like Equation 1. In this embodiment, the overlap ratio $R_{O,L}$ is 0%.

Figure 12:
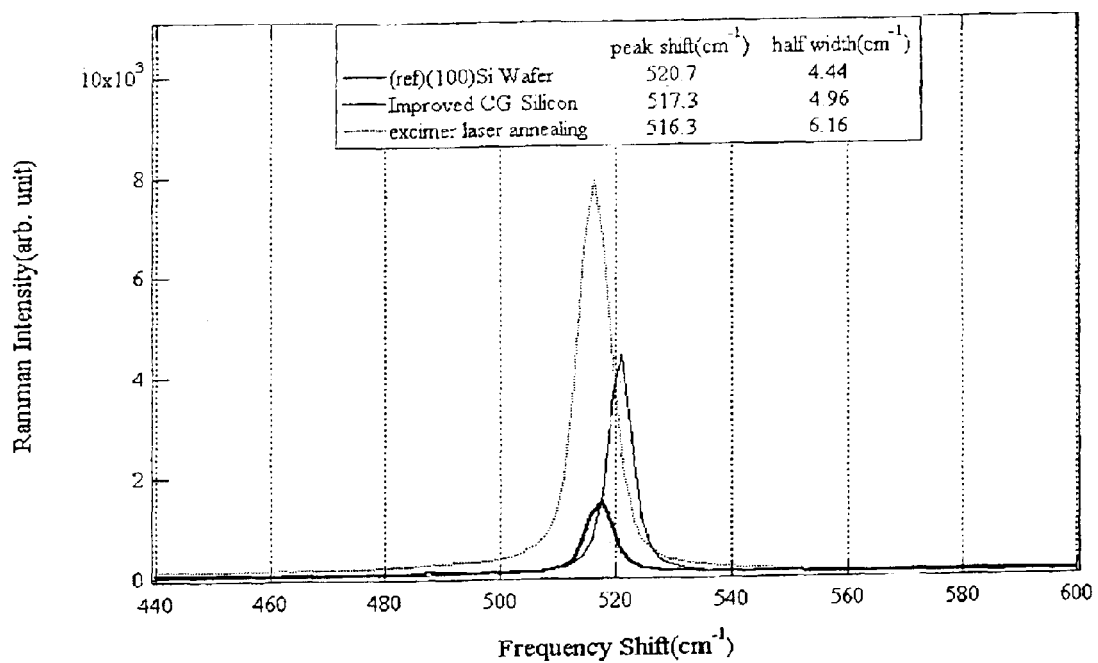
FIG. 12 is a graph showing results of Raman scattering spectroscopy performed on a semiconductor film.

In FIG. 12, a thick line indicates a result of Raman spectroscopy performed on the crystalline semiconductor film (represented by Improved CG-Silicon in FIG. 12) obtained by using the above-described crystallization method. Here, for comparison, a thin line indicates a result of Raman spectroscopy performed on the single crystal silicon (represented by ref. (100) Si Wafer in FIG. 12). In FIG. 12, a dotted line indicates a result of Raman spectroscopy performed on a semiconductor film (represented by excimer laser annealing in FIG. 12). In order to obtain the semiconductor film, an amorphous silicon film is formed and hydrogen contained in the semiconductor film is discharged through thermal processing. Then, the semiconductor film is crystallized by using excimer laser with pulse oscillation.

The Raman shift of the semiconductor film obtained by using the method of this embodiment has the peak at 517.3 $cm^{-1}$. The half value breadth is 4.96 $cm^{-1}$. On the other hand, the Raman shift of the single crystal silicon has the peak at 520.7 $cm^{-1}$. The half value breadth is 4.44 $cm^{-1}$. The Raman shift of the semiconductor film crystallized by using the excimer laser with the pulse oscillation has the peak at 516.3 $cm^{-1}$. The half value breadth is 6.16 $cm^{-1}$.

From the results in FIG. 12, the crystallinity of the semiconductor film obtained by using the crystallization method described in this embodiment is closer to that of the single crystal silicon than the crystallinity of the semiconductor film crystallized by using the excimer laser with pulse oscillation.

Embodiment 6

In this embodiment, a case where a semiconductor film crystallized by using the method described in the Embodiment 6 is used to manufacture a TFT will be described with reference to FIGS. 13A to 13H and an electrical characteristic of the manufactured TFT is described with FIGS. 14A and 14B.

Figure 13A:
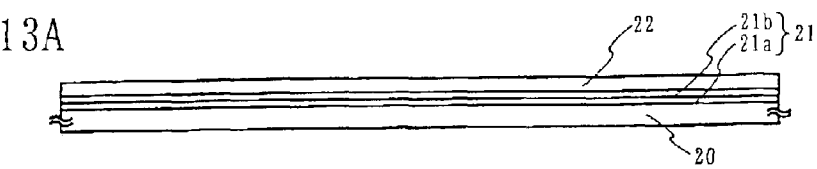
FIGS. 13A to 13H are sectional views showing a process of manufacturing TFTs.

A glass substrate is used as a substrate 20 in this embodiment. As a base film 21, 50 nm of silicon oxynitride film (composition ratio Si=32%, O=27%, N=24%, and H=17%)

and 100 nm of silicon oxynitride film (composition ratio Si=32%, O=59%, N=7%, and H=2%) are stacked on the glass substrate by plasma CVD method. Next, as a semiconductor film 22, 150 nm of amorphous silicon film is formed on the base film 21 by plasma CVD method. Then, thermal processing is performed thereon at 500° C. for three hours to discharge hydrogen contained in the semiconductor film (FIG. 13A).

Figure 13B:
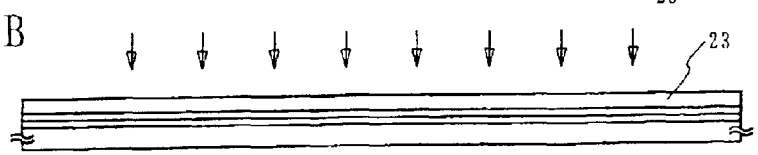

After that, the second harmonic (wavelength 532 nm, 5.5 W) of the continuous oscillating $YVO_4$ laser is used as the laser light to form an elliptical beam of 200 $\mu$m×50 $\mu$m having incident angle $\phi$ of about 20° of laser light with respect to the convex lens 153 in the optical system shown in FIG. 9. The elliptical beam is irradiated on the semiconductor film 22 by relatively being scanned at the speed of 50 cm/s (FIG. 13B).

Figure 13C:
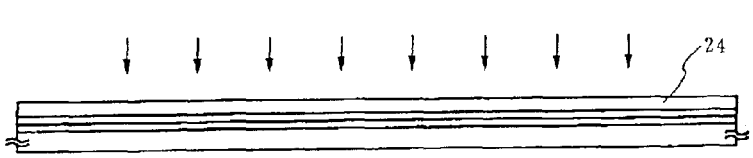

Then, first doping processing is performed thereon. This is channel doping for controlling the threshold value. $B_2H_6$ is used as material gas having a gas flow amount of 30 sccm, a current density of 0.05 $\mu$A, an accelerating voltage of 60 keV, and a dosage of $1\times10^{14}$/cm$^2$. Thus, the semiconductor film 24 is formed (FIG. 13C).

Figure 13D:
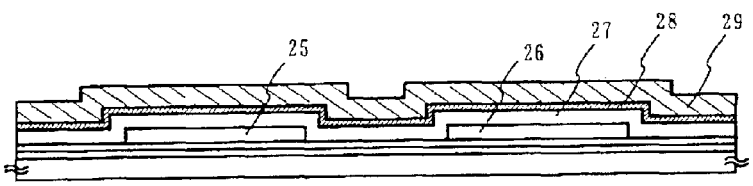

Next, after etching the semiconductor film 24 into a desired form by patterning, a silicon oxynitride film in 115 nm thick is formed by plasma CVD method as a gate insulating film 27 covering the etched semiconductor film. Then, a TaN film 28 in 30 nm thick and a W film 29 in 370 nm thick are stacked on the gate insulating film 27 as a conductive film (FIG. 13D).

A mask (not shown) made of resist is formed thereon by using photolithography method, and the W film, the TaN film and the gate insulating film are etched. Thus, the conductive layers 30, 31, and the gate insulating film 32 are formed.

Figure 13E:
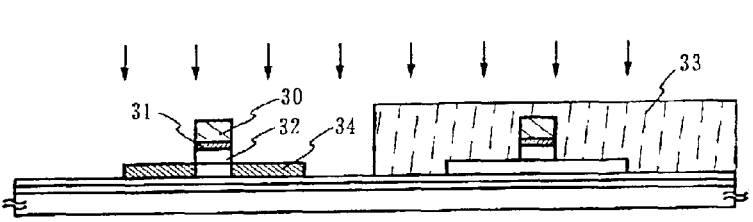

Then, the mask made of resist is removed, and a new mask 33 is formed. The second doping processing is performed thereon and an impurity element imparting the n-type to the semiconductor film is introduced. In this case, the conductive layers 30 and 31 are masks for the impurity element imparting the n-type, and an impurity region 34 is formed in a self-aligned manner. In this embodiment, the second doping processing is performed under two conditions because the semiconductor film is thick as much as 150 nm. In this embodiment, phosphine ($PH_3$) is used as material gas. The dosage of $2\times10^{13}$/cm$^2$ and the accelerating voltage of 90 keV are used, and then the dosage of $5\times10^{14}$/cm$^2$ and the accelerating voltage of 10 keV are used for the processing (FIG. 13E).

Figure 13F:
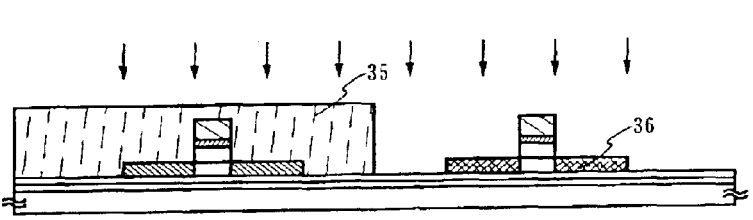

Next, the mask 33 made of resist is removed, and a new mask 35 made of resist is formed additionally for performing the third doping processing. Through the third doping processing, an impurity region 36 is formed containing an impurity element for imparting the opposite conductive type against the one conductive type to the semiconductor film, which is an active layer of a p-channel TFT. By using the conductive layers 30 and 31 as a mask for the impurity element, the impurity region 36 is formed in the self-aligned manner by addition of the impurity element for imparting the p-type. Also the third doping processing in this embodiment is performed under two conditions because the semiconductor film is thick as much as 150 nm. In this embodiment, diborane ($B_2H_6$) is used as material gas. The dosage of $2\times10^{13}$/cm$^2$ and the accelerating voltage of 90 keV are used, and then the dose amount of $1\times10^{15}$/cm$^2$ and the accelerating voltage of 10 keV are used for the processing (FIG. 13F).

Through these steps, the impurity regions 34 and 36 are formed on the respective semiconductor layers.

Next, the mask 35 made of resist is removed, and silicon oxynitride film (composition ratio Si=32.8%, O=63.7%, and N=3.5%) in 50 nm thick is formed as a first interlayer insulating film 37 by plasma CVD method.

Figure 13G:

Next, thermal processing is performed thereon to recover crystallinity of the semiconductor layers and to activate the impurity elements added to the semiconductor layers, respectively. Then, thermal processing by thermal annealing method using an anneal furnace is performed at 550° C. for four hours in a nitrogen atmosphere (FIG. 13G).

Next, a second interlayer insulating film 38 of an inorganic or organic insulating material is formed on the first interlayer insulating film 37. In this embodiment, after forming a silicon nitride film in 50 nm thick by CVD method, a silicon oxide film in 400 nm thick is formed.

After the thermal processing, hydrogenation processing can be performed. In this embodiment, the thermal processing is performed at 410° C. for one hour in a nitrogen atmosphere by using an anneal furnace.

Figure 13H:
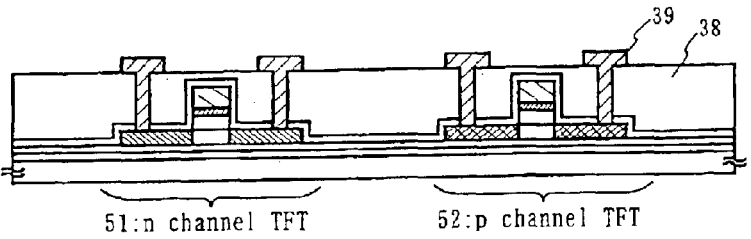

Next, a wiring 39 is formed for connecting to the impurity regions electrically. In this embodiment, the wiring 39 is formed by patterning a laminate film of a Ti film in 50 nm thick, an Al—Si film in 500 nm thick and a Ti film in 50 nm thick. Naturally, the construction is not limited to the two-layer construction, but may be a single layer construction or a laminate construction having three or more layers. The material of the wiring is not limited to Al and Ti. For example, Al and/or Cu may be formed on a TaN film. Then, a laminate film having a Ti film may be patterned to form a wiring (FIG. 13H).

In this way, the n-channel TFT 51 and the p-channel TFT 52 are formed, both having the channel length of 6 $\mu$m and the channel width of 4 $\mu$m.

Figure 14A:
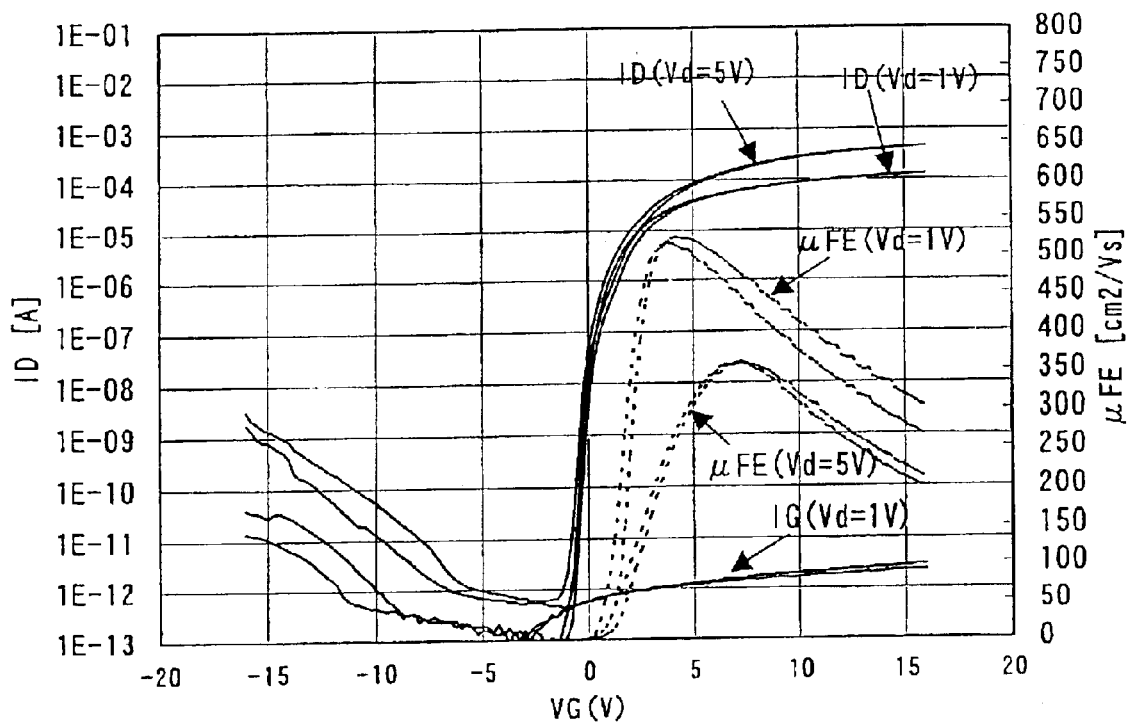
FIGS. 14A and 14B are a graph showing electric characteristics of an n-channel TFT and a graph showing electric characteristics of a p-channel TFT, respectively.
Figure 14B:
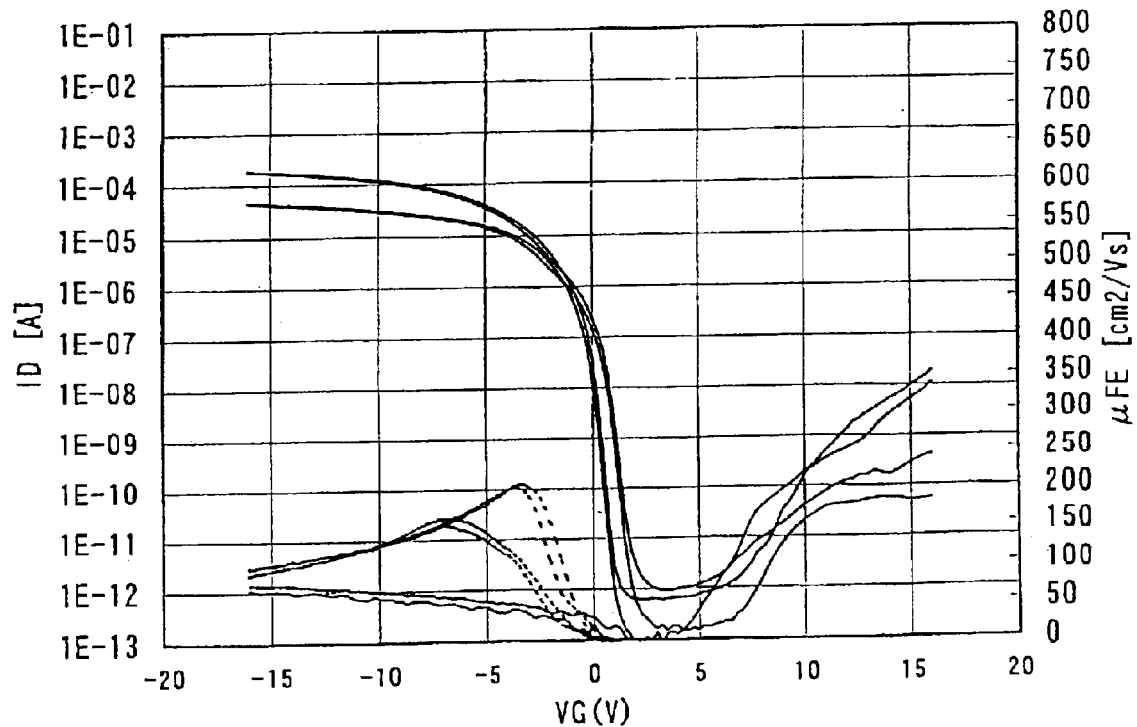

FIGS. 14A and 14B show results of measuring these electrical characteristics. FIG. 14A shows an electric characteristic of the n-channel TFT 51. FIG. 14B shows an electric characteristic of the p-channel TFT 52. The electric characteristics are measured at two measurement points in a range of gate voltage Vg=−16 to 16 V and in the range of drain voltage Vd=1 V and 5 V. In FIGS. 14A and 14B, the drain current (ID) and the gate current (IG) are indicated by solid lines. The mobility ($\mu$FE) is indicated by a dotted line.

Because large crystal grains are formed on the semiconductor film crystallized according to the present invention, the number of crystal grain boundaries containing the channel forming region can be reduced when a TFT is manufactured by using the semiconductor film. Furthermore, because the formed crystal grains direct to the same direction, the number of times of crossing the crystal grain boundaries by carriers can be extremely reduced. Therefore, a TFT having the good electric characteristic can be obtained as shown in FIGS. 14A and 14B. Especially, the mobility is 524 cm$^2$/Vs in the n-channel TFT and 205 cm$^2$/Vs in the p-channel TFT. When a display device is manufactured by using this type of TFT, the operational characteristic and the reliability can be improved also.

Since TFT manufactured using the process as shown in this embodiment has the high mobility, it becomes possible to realize the logic circuit of high-speed operation. For example, it becomes possible to realize 5 MHz or more as frequency of operation in CPU, DSP, a graphics accelerator, an image-processing circuit, a timing generator, and the like. Moreover, it is possible to realize 200 nsec or less as a read-out speed of SRAM. Moreover, it is possible to realize below 1 $\mu$sec as a read-out speed of DRAM. By realizing such a high-speed logic circuit, it becomes possible to manufacture a more complicated system on the substrate that has the insulated surface.

In other words, when restriction of a speed of operation decreased, it becomes possible to form more various logic circuits or systems, and it becomes possible to realize more highly efficient and small semiconductor device.

Embodiment 7

In this embodiment, a case where a TFT is manufactured by using a semiconductor film crystallized by using the method described in Embodiment 5 will be described with reference to FIG. 15 and FIGS. 16A to 18B.

Figure 15A:
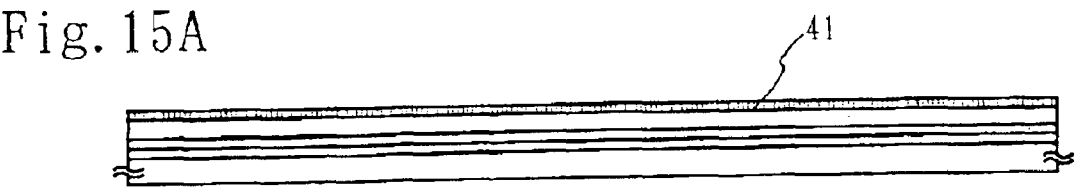
FIGS. 15A to 15C are sectional views showing a process of crystallizing a semiconductor.

The steps up to forming the amorphous silicon film as the semiconductor film are the same as Embodiment 6. The amorphous silicon film is formed in 150 nm thick (FIG. 15A).

Figure 15B:

After that, the method disclosed in the Japanese Patent Application Laid-Open No. Hei 7-183540 is used. Nickel acetate solution (5 ppm in weight conversion concentration and 10 ml in volume) is coated on the semiconductor film by spin coating method to form a metal containing layer 41. Then, thermal processing is performed thereon in a nitrogen atmosphere at 500° C. for one hour and in a nitrogen atmosphere at 550° C. for twelve hours. Then, a semiconductor film 42 is obtained (FIG. 15B).

Then, the crystallinity of the semiconductor film 42 is improved by laser annealing method.

As the laser used for laser annealing method, continuous oscillating $YVO_4$ laser is used. For the condition for the laser annealing method, the second harmonic (wavelength 532 nm, 5.5 W) of the $YVO_4$ laser is used as laser light. The elliptical beam of 200 μm×50 μm is formed having incident angle φ of about 20° of laser light with respect to the convex lens 53 in the optical system shown in FIG. 9. The elliptical beam is moved and irradiated to the substrate at the speed of 20 cm/s or 50 cm/s. Thus, the crystallinity of the semiconductor film 42 is improved. As a result, a semiconductor film 43 is obtained (FIG. 15C).

Figure 15C:
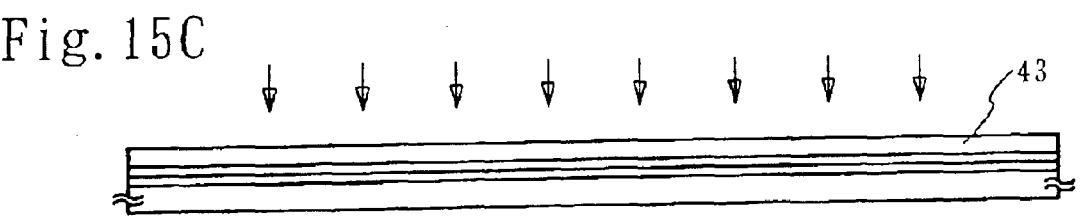

The steps after the crystallizing the semiconductor film in FIG. 15C are the same as the steps shown in FIGS. 13C to 13H shown in Embodiment 6. In this way, the n-channel TFT 51 and the p-channel TFT 52 are formed, both having the channel length of 6 μm and the channel width of 4 μm. These electrical characteristics are measured.

FIGS. 16A to 18B show electric characteristics of the TFT manufactured through these steps.

Figure 16A:
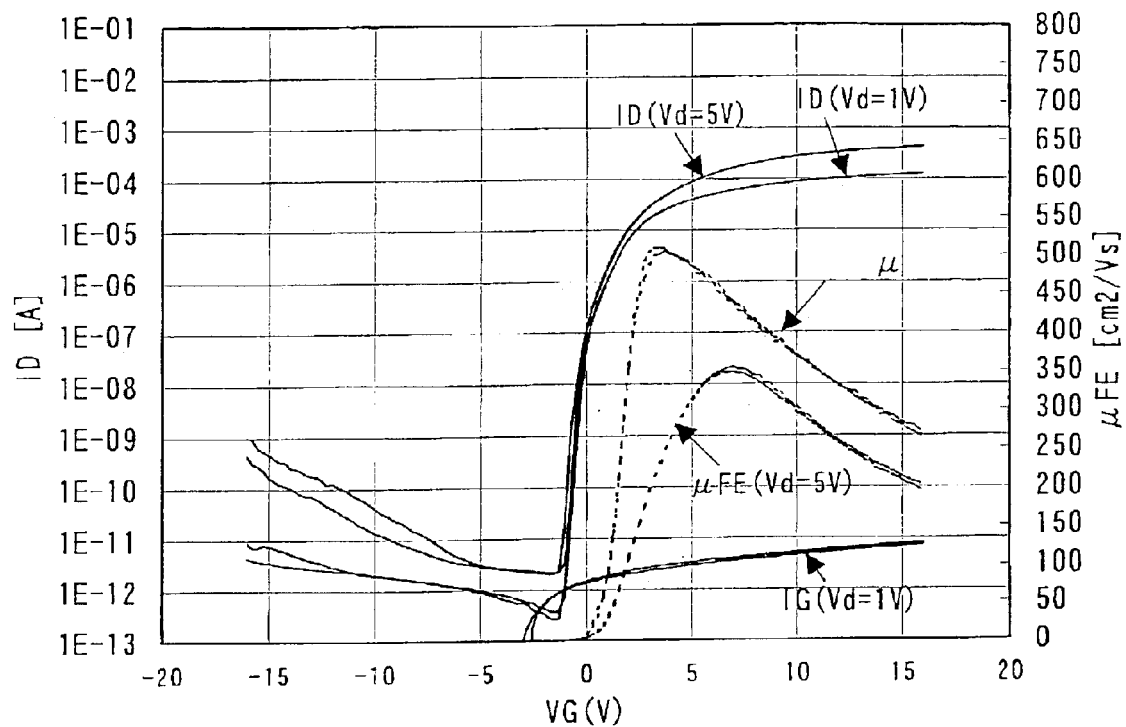
FIGS. 16A and 16B are a graph showing electric characteristics of an n-channel TFT and a graph showing electric characteristics of a p-channel TFT, respectively.
Figure 16B:
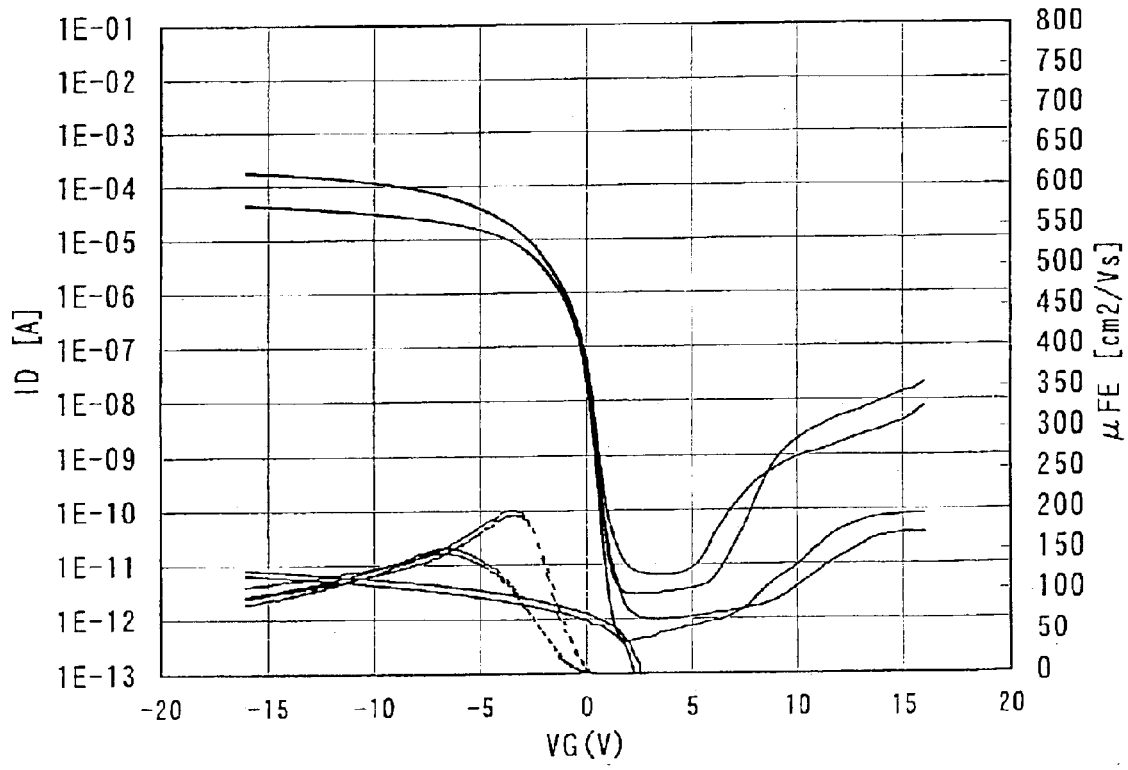
Figure 17A:
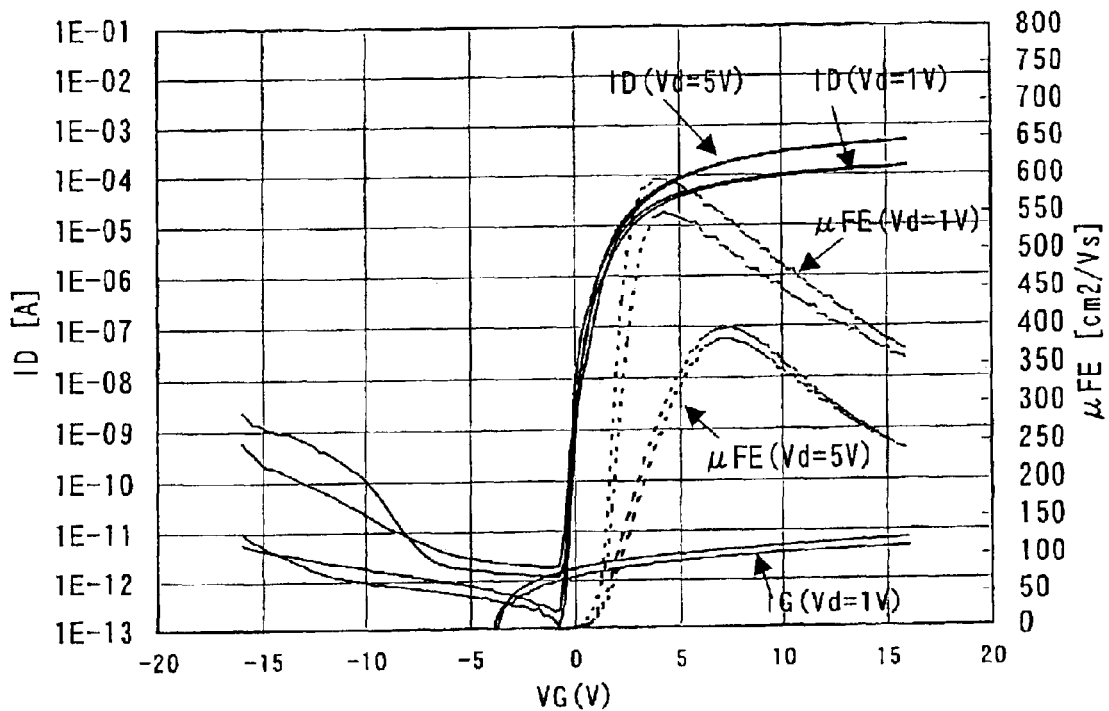
FIGS. 17A and 17B are a graph showing electric characteristics of an n-channel TFT and a graph showing electric characteristics of a p-channel TFT, respectively.
Figure 17B:
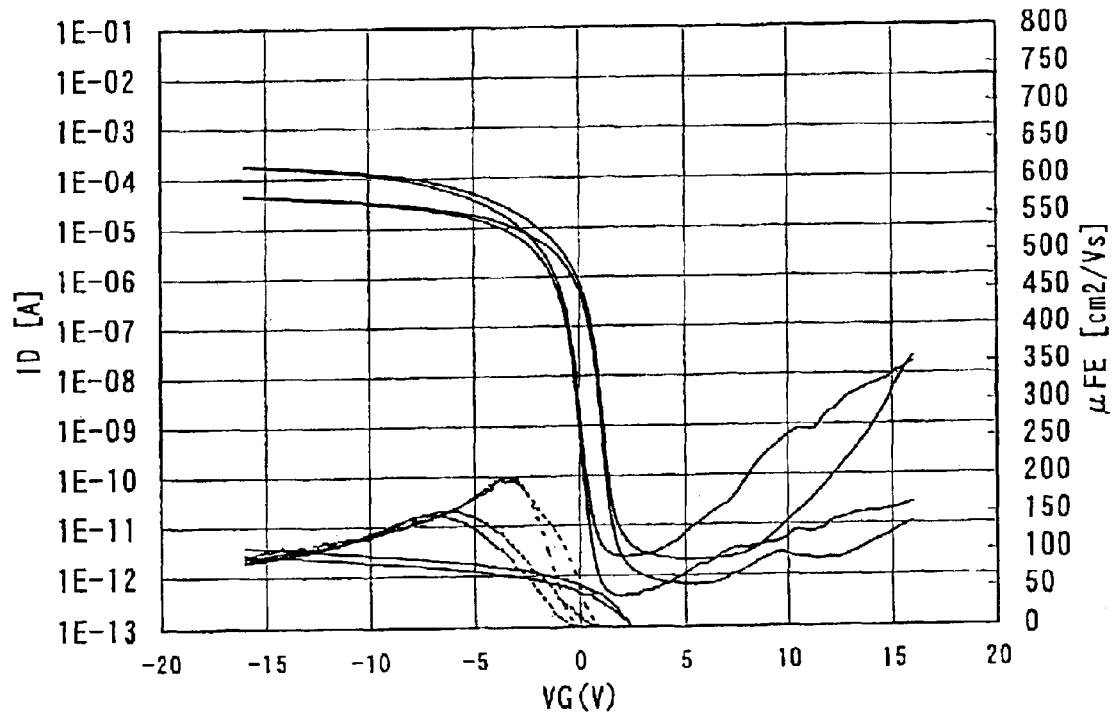

FIGS. 16A and 16B show these electrical characteristics of a TFT manufactured by moving the substrate at the speed of 20 cm/s in the laser annealing step in FIG. 15C. FIG. 16A shows an electric characteristic of the n-channel TFT 51. FIG. 16B shows an electric characteristic of the p-channel TFT 52. FIGS. 17A and 17B show these electrical characteristics of a TFT manufactured by moving the substrate at the speed of 50 cm/s in the laser annealing step in FIG. 15C. FIG. 17A shows an electric characteristic of the n-channel TFT 51. FIG. 17B shows an electric characteristic of the p-channel TFT 52.

The electric characteristics are measured in a range of gate voltage Vg=−16 to 16 V and in the range of drain voltage Vd=1 V and 5 V. In FIGS. 16A to 17B, the drain current (ID) and the gate current (IG) are indicated by solid lines. The mobility (μFE) is indicated by a dotted line.

Because large crystal grains are formed on the semiconductor film crystallized according to the present invention, the number of crystal grain boundaries contained in the channel forming region can be reduced when a TFT is manufactured by using the semiconductor film. Furthermore, the formed crystal grains direct to the same direction. In addition, the small number of grain boundaries is laid in a direction crossing the relative scanning direction of laser light. Therefore, the number of times of crossing the crystal grain boundaries by carriers can be extremely reduced.

Accordingly, a TFT having the good electric characteristic can be obtained as shown in FIGS. 16A to 17B. Especially, the mobility is 510 $cm^2$/Vs in the n-channel TFT and 200 $cm^2$/Vs in the p-channel TFT in FIGS. 16A and 16B. The mobility is 595 $cm^2$/Vs in the n-channel TFT and 199 $cm^2$/Vs in the p-channel TFT in FIGS. 17A and 17B. When a semiconductor apparatus is manufactured by using this type of TFT, the operational characteristic and the reliability can be also improved.

Figure 18A:
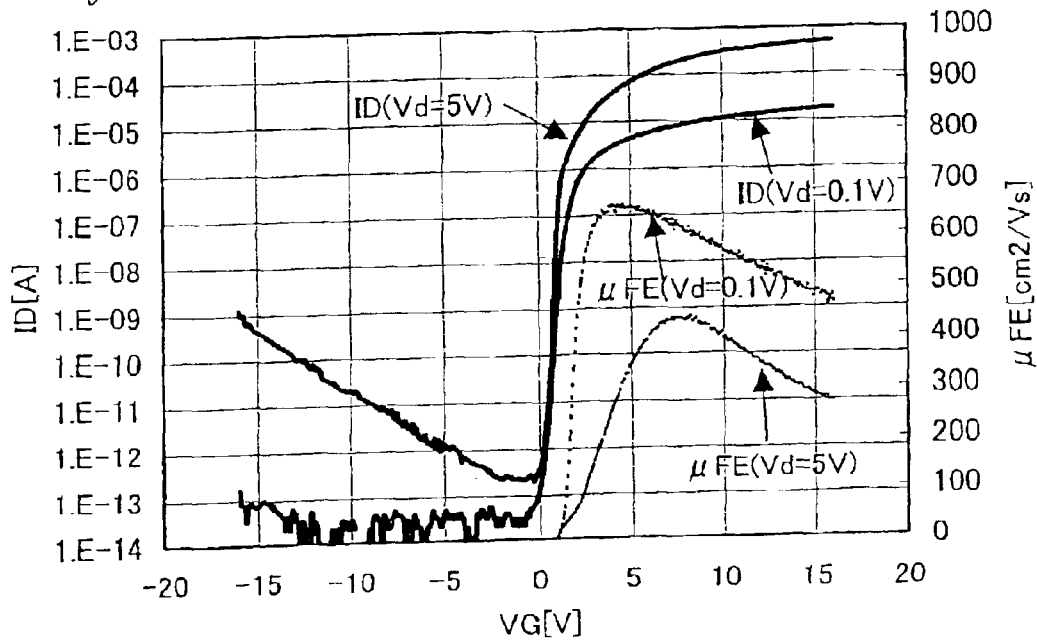
FIGS. 18A and 18B are a graph showing electric characteristics of an n-channel TFT and a graph showing electric characteristics of a p-channel TFT, respectively.
Figure 18B:
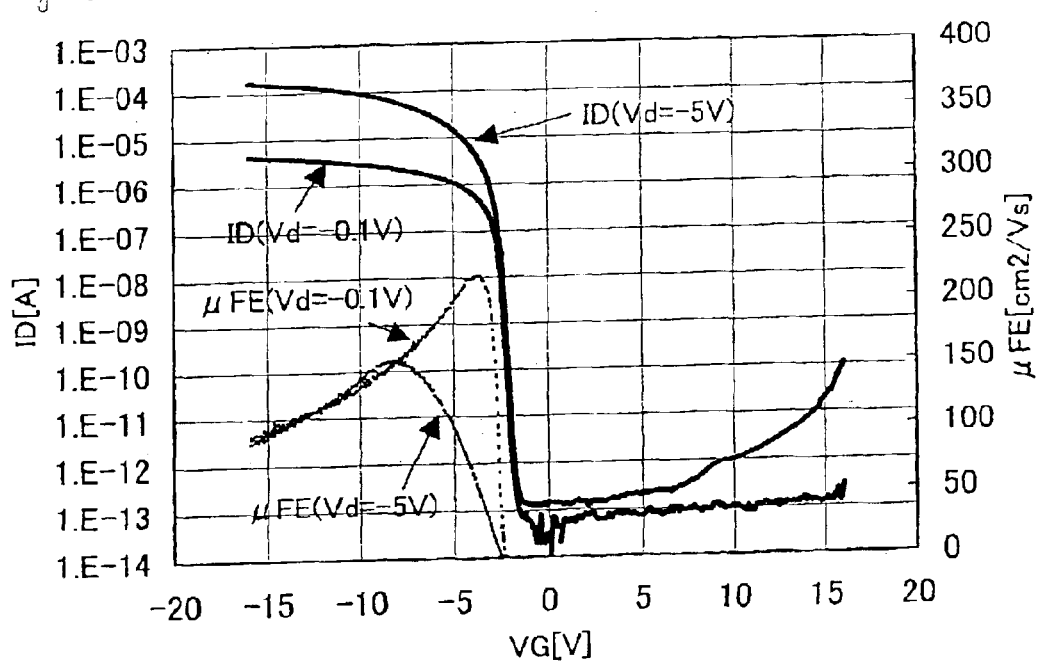

FIGS. 18A and 18B show these electrical characteristics of a TFT manufactured by moving the substrate at the speed of 50 cm/s in the laser annealing step in FIG. 15C that is a different from shown in FIGS. 17A and 17B. FIG. 18A shows an electric characteristic of the n-channel TFT 51. FIG. 18B shows an electric characteristic of the p-channel TFT 52.

The electric characteristics are measured in a range of gate voltage Vg=−16 to 16 V and in the range of drain voltage Vd=0.1 V and 5 V.

As shown in FIGS. 18A and 18B, a TFT having the good electric characteristic can be obtained. Especially, the mobility is 657 $cm^2$/Vs in the n-channel TFT in FIG. 18A and 219 $cm^2$/Vs in the p-channel TFT in FIG. 18B. When a semiconductor apparatus is manufactured by using this type of TFT, the operational characteristic and the reliability can be also improved.

Since TFT manufactured using the process as shown in this embodiment has the high mobility, it becomes possible to realize the logic circuit of high-speed operation. For example, it becomes possible to realize 5 MHz or more as frequency of operation in CPU, DSP, a graphics accelerator, an image-processing circuit, a timing generator, and the like. Moreover, it is possible to realize 200 nsec or less as a read-out speed of SRAM. Moreover, it is possible to realize below 1 μsec as a read-out speed of DRAM. By realizing such a high-speed logic circuit, it becomes possible to manufacture a more complicated system on the substrate that has the insulated surface.

In other words, when restriction of a speed of operation decreased, it becomes possible to form more various logic circuits or systems, and it becomes possible to realize more highly efficient and small semiconductor device.

Embodiment 8

Figure 19:
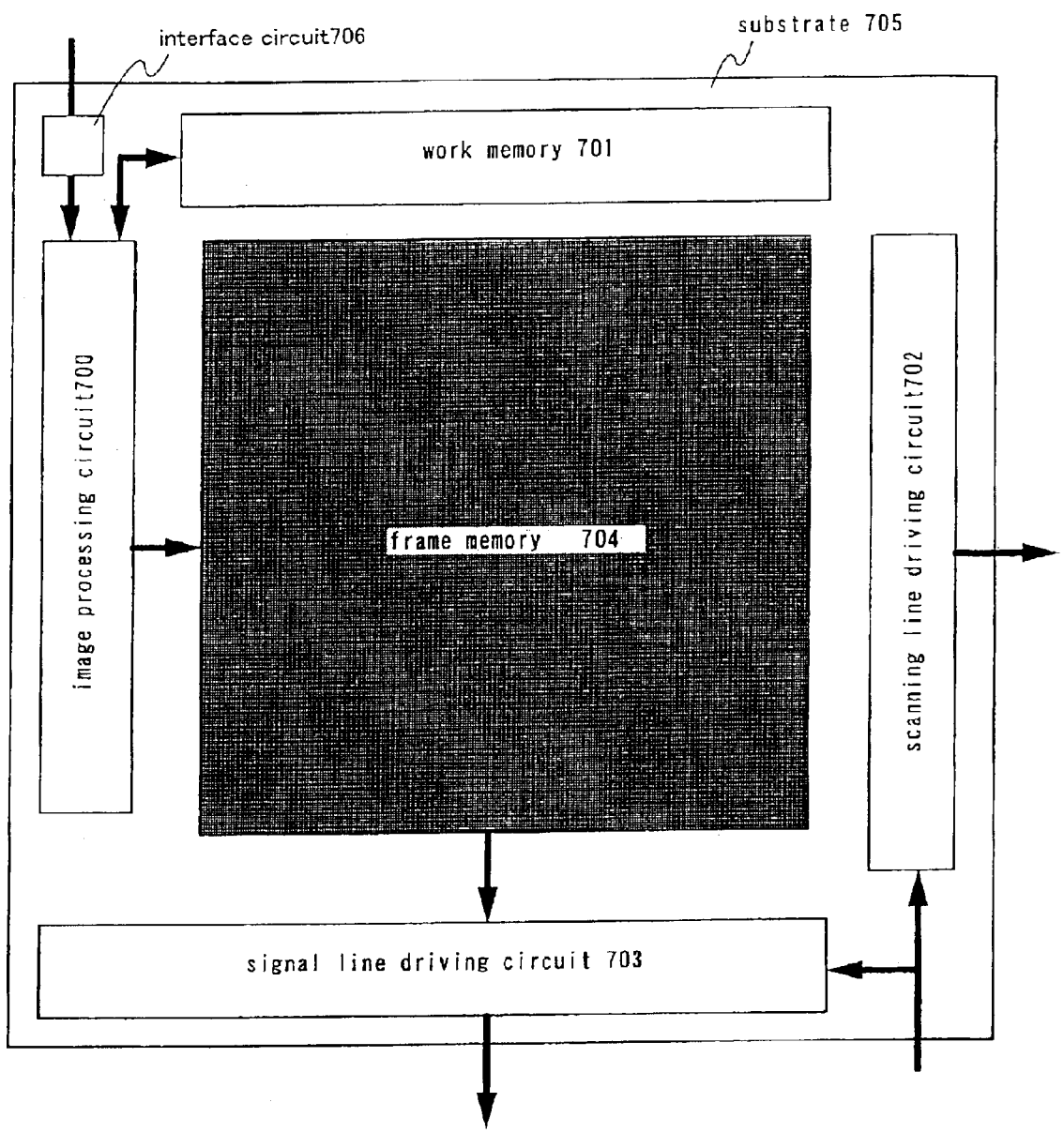
FIG. 19 is a schematic diagram showing an example of a circuit structure below a liquid crystal display.

FIG. 19 is a block diagram of logic circuits of a semiconductor device. In the semiconductor device, pixels of a passive matrix liquid crystal display are formed on a substrate 705 and the logic circuits are formed in a region below the pixels. An image processing circuit 700 receives data from an external device through an interface circuit 706. The image processing circuit 700 reads data out of a work memory 701 where a control signal or data for creating image data is stored temporarily and writes data in the work memory 701 as the need arises. The image processing circuit 700 two-dimensionally accesses a frame memory 704 to write image data to be displayed on the display. The image data written in the frame memory 704 is sent to a signal line driving circuit 703 and a scanning line driving circuit 702, so that an image is displayed using pixels. A DRAM or SRAM is used as the work memory 701 and the frame memory 704. The frame memory may be omitted if it is not necessary. Some of the logic circuits may be mounted externally.

The TFT manufacturing method of this embodiment can be combined with Embodiments 3 through 7.

Embodiment 9

Figure 20:
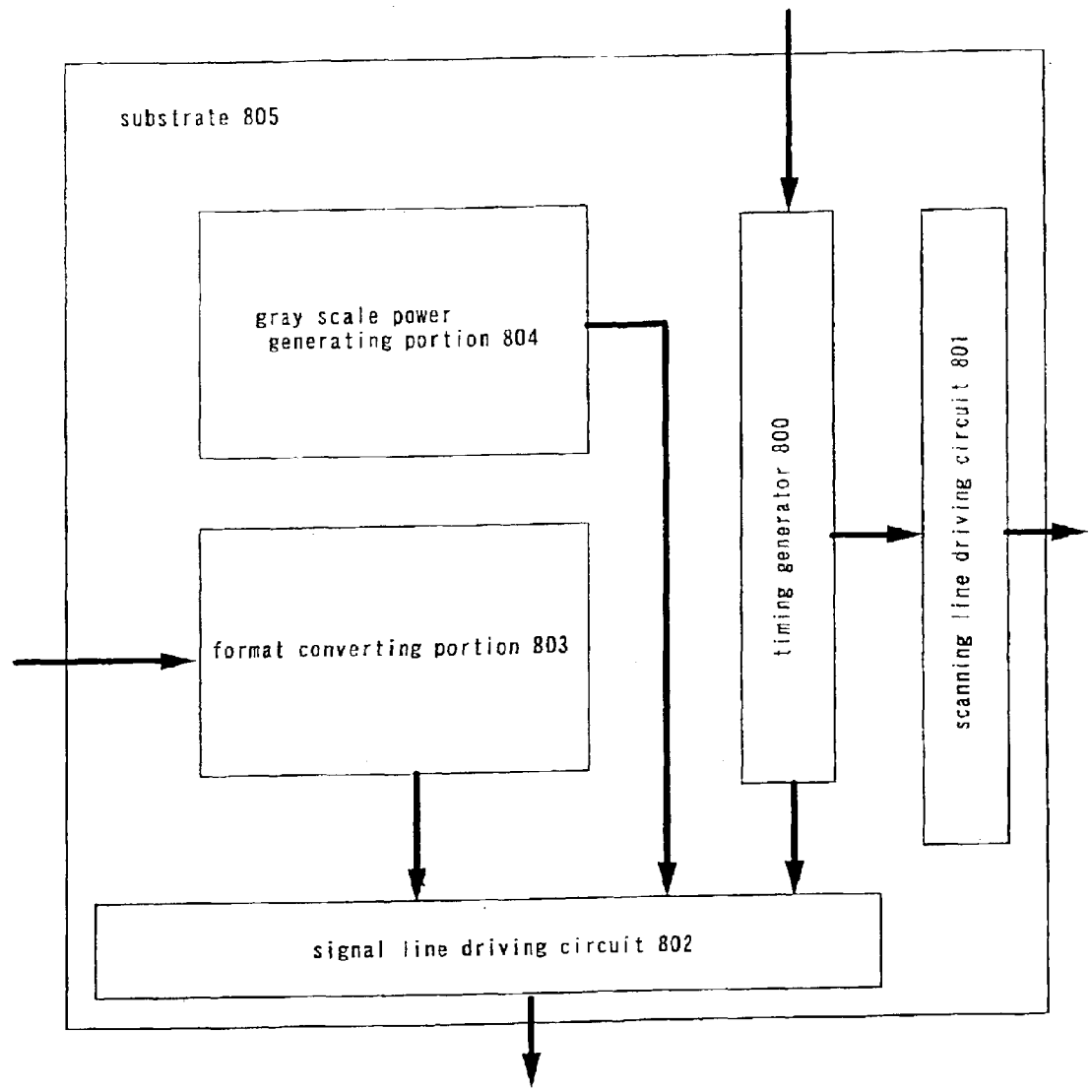
FIG. 20 is a schematic diagram showing an example of a circuit structure below a liquid crystal display.

FIG. 20 is a block diagram of logic circuits of a semiconductor device. In the semiconductor device, pixels of a passive matrix liquid crystal display are formed on a substrate 805 and the logic circuits are formed on the substrate 805 in a region below the pixels. A timing generator 800 generates clock signals for determining operation timing of a scanning line driving circuit 801 and a signal line driving circuit 802. A gray scale power generating portion 804 outputs a voltage for determining the gray scale reference. A format converting portion 803 performs image processing such as decompression and decode of input signals that have been compressed and encoded, and interpolation and resizing of images. The image data that has finished format conversion is sent to the scanning line driving circuit 801 and the signal line driving circuit 802, so that an image is displayed using pixels. Some of the above logic circuits may be mounted externally.

The TFT manufacturing method of this embodiment can be combined with Embodiments 3 through 7.

Embodiment 10

Figure 21:
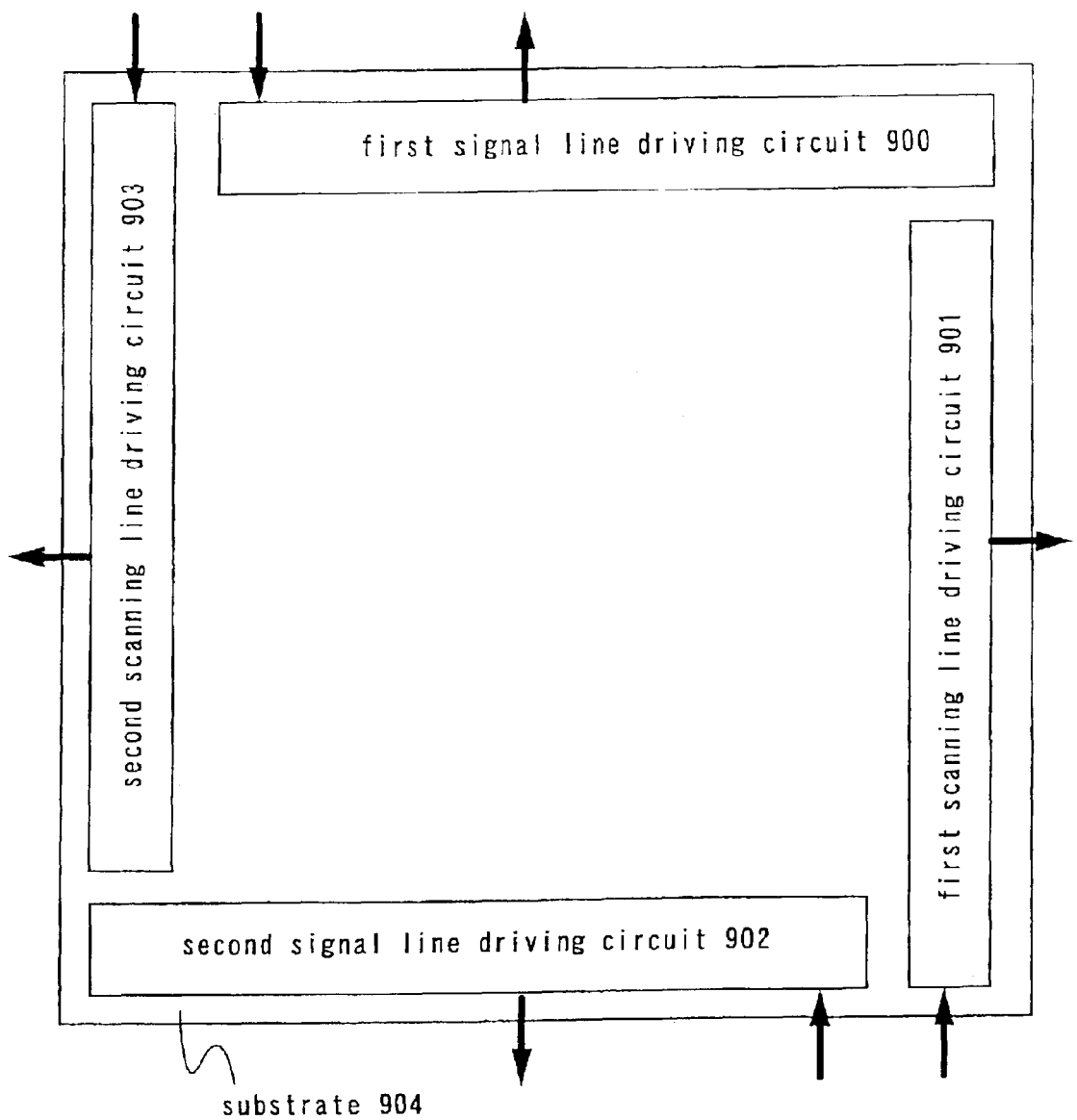
FIG. 21 is a schematic diagram showing an example of a circuit structure below a liquid crystal display.

FIG. 21 is a block diagram of logic circuits of a semiconductor device. In the semiconductor device, pixels of a passive matrix liquid crystal display are formed on a substrate 904 and the logic circuits are formed in a region below the pixels. The logic circuits in the semiconductor device shown in FIG. 21 are a first scanning line driving circuit 901, a second scanning line driving circuit 903, a first signal line driving circuit 900, and a second signal line driving circuit 902, and they are formed along the four sides of the substrate. In this embodiment, a background image outputted from the first signal line driving circuit 900 to a first signal line (not shown in the drawing) is scanned by the first scanning line driving circuit 901 to display the background image. Text data outputted from the second signal line driving circuit 902 to a second signal line (not shown in the drawing) is scanned by the second scanning line driving circuit 903 to display text independent of display of a background image.

Arrangement of the driving circuits is not limited to the above and each driving circuit may be divided into more than two. Some of the driving circuits may be mounted externally.

The TFT manufacturing method of this embodiment can be combined with Embodiments 3 through 7.

Embodiment 11

Figure 22:
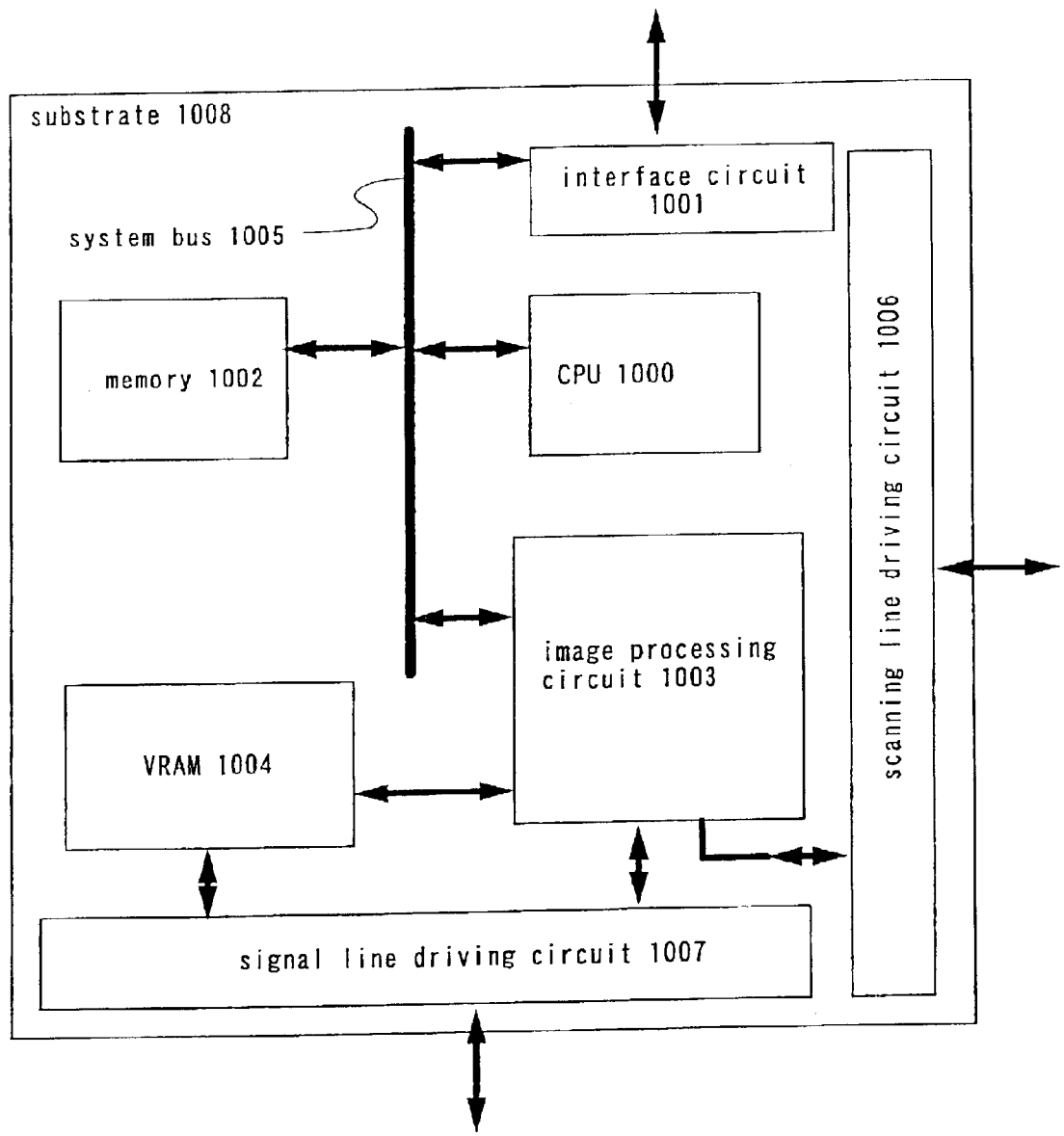
FIG. 22 is a schematic diagram showing an example of a circuit structure below a liquid crystal display.

FIG. 22 is a block diagram of logic circuits of a portable game machine. In the portable game machine, pixels of a passive matrix liquid crystal display are formed and the logic circuits are formed on a substrate 1008 in a region below the pixels.

Data is sent from an external device that is not placed on the substrate 1008 to a system bus 1005 through an interface circuit 1001. Examples of the external device include a ROM and a keyboard. Communication with the external device is control led by a CPU 1000. The data past the system bus 1005 is stored in a memory 1002. Then the data is subjected to image processing by an image processing circuit 1003 and is stored in a VRAM 1004. The image data stored in the VRAM 1004 is set to a scanning line driving circuit 1006 and a signal line driving circuit 1007, so that an image is displayed using pixels. A DRAM or SRAM is used as the memory 1002 and the VRAM 1004. Some of the above logic circuits may be mounted externally.

The TFT manufacturing method of this embodiment can be combined with Embodiments 3 through 7.

Embodiment 12

Examples of electronic devices to which the present invention is applied include a video camera, a digital camera, a goggle type display (head-mounted display), a navigation system, a sound reproducing system (car audio system, audio component stereo, or the like), a laptop, a game player, a portable information terminal (mobile computer, portable telephone, portable game player, electronic book, or the like), and an image reproducing system provided with a recording medium (specifically, device which plays a recording medium such as a digital versatile disc (DVD) and is provided with a display for displaying images). Specific examples of the electronic devices are shown in FIGS. 23A to 23G.

Figure 23A:
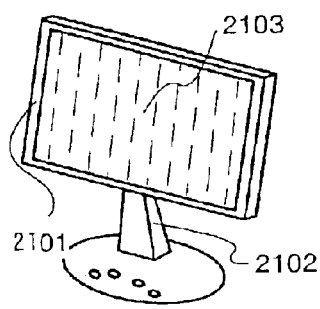
FIGS. 23A to 23G are perspective views of electronic equipment with a display mounted thereto.

FIG. 23A shows a display device, which includes a casing 1401, a support stand 1402, and a display unit 1403. The present invention can be applied to the display unit 1403.

Figure 23B:
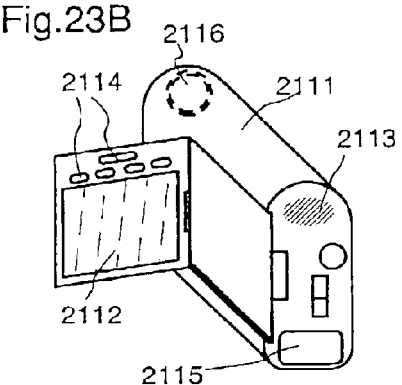

FIG. 23B shows a video camera, which is constituted by a main body 1411, a display unit 1412, a sound input portion 1413, operation switches 1414, a battery 1415, an image receiving portion 1416, and the like. The present invention can be applied to the display unit 1412.

Figure 23C:
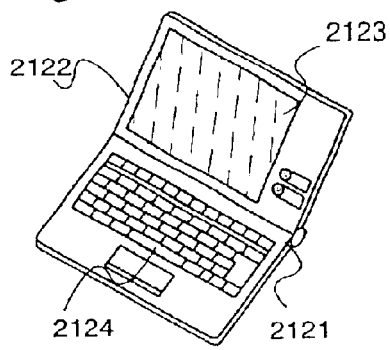

FIG. 23C shows a laptop computer, which is constituted by a main body 1421, a casing 1422, a display unit 1423, a keyboard 1424, and the like. The present invention can be applied to the display unit 1423.

Figure 23D:
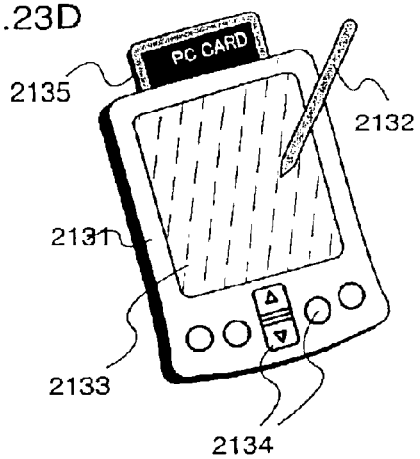

FIG. 23D shows a portable information terminal, which is constituted by a main body 1431, a stylus 1432, a display unit 1433, operation buttons 1434, an external interface 1435, and the like. The present invention can be applied to the display unit 1433.

Figure 23E:
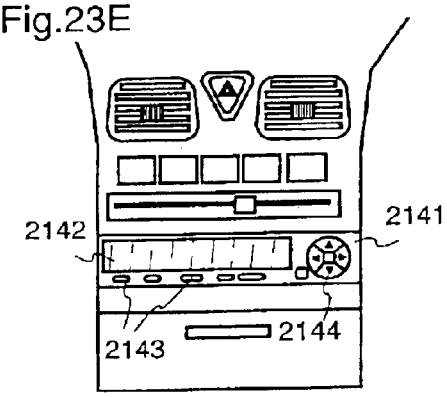

FIG. 23E shows a sound reproducing system, specifically, an audio system for an automobile, which is constituted by a main body 1441, a display unit 1442, operation switches 1443 and 1444, and the like. The present invention can be applied to the display unit 1442. Further, the audio system for an automobile is taken as an example here, but a portable or domestic audio system may be given.

Figure 23F:
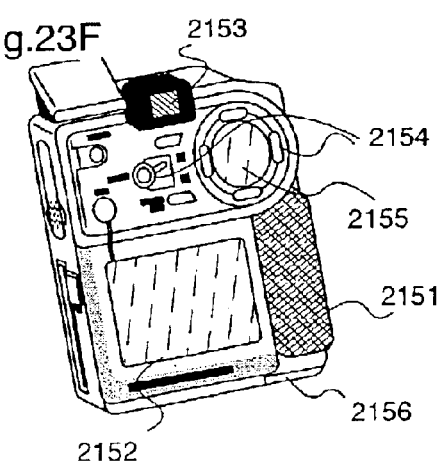

FIG. 23F shows a digital camera, which is constituted by a main body 1451, a display unit A 1452, an eyepiece portion 1453, operation switches 1454, a display unit B 1455, a battery 1456, and the like. The present invention can be applied to the display unit A 1452 and the display unit B 1455.

Figure 23G:
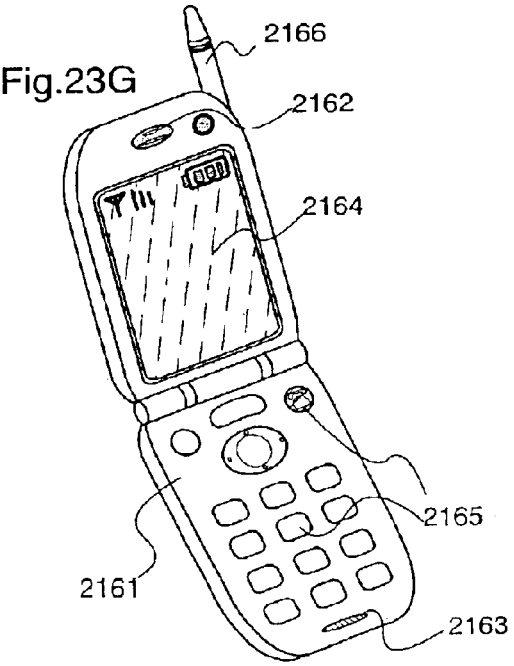

FIG. 23G shows a portable telephone, which is constituted by a main body 1461, a sound output portion 1462, a sound input portion 1463, a display unit 1464, operation switches 1465, an antenna 1466, and the like. The present invention can be applied to the display unit 1464.

Not only a glass substrate but also a heat-resistance plastic substrate can be used for the display device used in each of the above electronic devices. Thus, reduction in weight of the electronic device can be attained.

It is noted that the above are described just as part of example, the present invention is not limited to these applications.

Further, the electronic device in this embodiment can be realized by using the structure based on any combination of Embodiments 1 to 11.

Embodiment 13

This embodiment describes an example in which a signal line driving circuit and a scanning line driving circuit are formed on a first substrate (also called a pixel substrate) having an insulating surface, a CPU as an example of a logic circuit is formed on a second substrate (also called an opposite substrate) facing the first substrate, and the signal line driving circuit and the scanning line driving circuit (hereinafter these circuits being referred to as driving circuits) are connected to the CPU by wire bonding. The description is given with reference to FIGS. 24A and 24B.

Figure 24A:
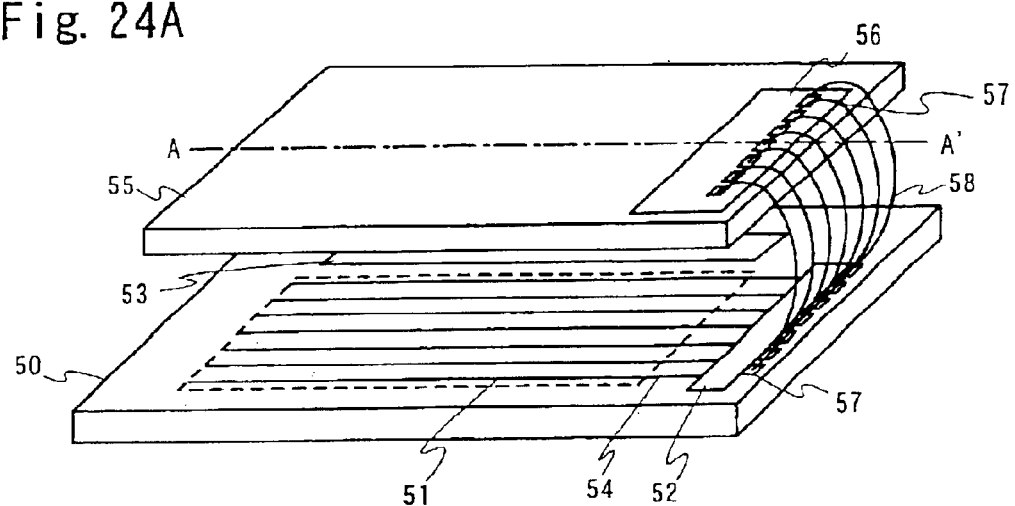
FIGS. 24A and 24B are schematic diagrams of a passive matrix display device.

FIG. 24A shows a passive matrix display device having a first substrate 50 and a second substrate 55. A signal line driving circuit 52, a scanning line driving circuit 53, and a first electrode 54 connected to the signal line driving circuit are formed on the first substrate 50. A second electrode 54' to serve as an opposite electrode and a CPU 56 are formed on the second substrate 55. The signal line driving circuit, the scanning line driving circuit, and the CPU have TFTs.

The second electrode 54' is placed on a face of the second substrate 55 that faces the first substrate (hereinafter referred to as primary face). The CPU 56 is placed on a face of the second substrate 55 that is opposite to the primary face (hereinafter referred to as secondary face).

Figure 24B:
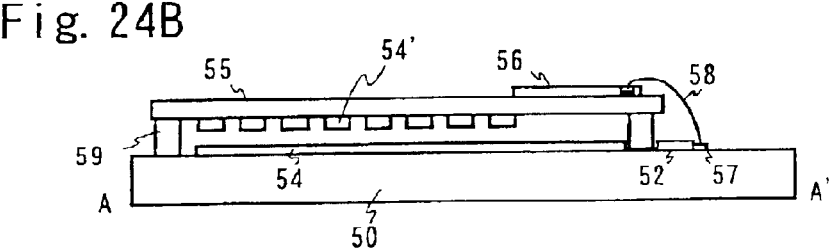

FIG. 24B is a sectional view taken along the line A-A' in FIG. 24A. A liquid crystal material (liquid crystal layer) is provided between the first substrate 50 and the second substrate 55 but is not shown in the drawing for conveniences' sake.

The TFTs of the signal line driving circuit and scanning line driving circuit and the first electrode 54 which are placed on the first substrate can be manufactured by any method described in Embodiments 3 through 11.

Described next is a method of manufacturing the second electrode 54' and the CPU 56 which are placed on the second substrate.

Consulting any method described in Embodiments 3 through 11, TFTs functioning as the CPU are formed first on the secondary face of the second substrate. Thereafter, a dummy substrate is placed on the TFTs to form on the primary face of the second substrate the second electrode 54' and, if necessary, color filters, a planarization film, and the like. The dummy substrate is then peeled off to obtain the second substrate on which the CPU and the second electrode are formed.

Alternatively, the TFTs may be formed after the second electrode 54' is formed and a dummy substrate is formed on the second electrode. In this case, however, a material that can withstand the heat in the TFT manufacturing process has to be used for the second electrode 54' and crystallization and activation (e.g., laser treatment) in the TFT manufacturing process must be gentle enough to avoid affecting the second electrode.

Openings (each measuring about 100 $\mu$m×100 $\mu$m) are formed in a passivation film for protecting the TFTs, thereby forming plural electrode pads 57 in a part (perimeter) of the CPU 56. The passivation film is a SiN film, a SiN/TEOS film with TEOS mixed to relieve the stress of SiN, or an acrylic film or other films containing an organic resin material. Similarly, openings are formed in a passivation film in the driving circuits to form another set of electrode pads 57.

Next, the first substrate 50 and the second substrate 55 are bonded to each other by a seal agent 59 provided between the pixel portion and the driving circuits. In bonding the substrates, the seal agent 59 may double as a spacer for keeping the distance (gap) between the first substrate and the second substrate. Columnar spacers or spherical spacers may be provided in order to keep the gap accurately.

The seal agent 59 may be placed outside the driving circuits or may be placed so as to cover the pixel portion and the driving circuits partially. However, in the case where the seal agent is placed on the pixel portion or the driving circuits, placement of the seal agent has to be decided taking into consideration the stress on the pixel portion and the driving circuits upon bonding.

Thereafter the electrode pads of the CPU are connected to the electrode pads of the driving circuits by wire bonding using wires 58.

As described, according to the present invention, a CPU can be formed on a second substrate above driving circuits and therefore a passive matrix display device can be reduced in size. The present invention can also provide a transmissive passive matrix display device by forming a CPU only above driving circuits as in this embodiment.

The signal line driving circuit 52 and the scanning line driving circuit 53, which have a relatively high drive voltage (ranging between 10 V and 20 V), and the CPU 55, which has a relatively low drive voltage (lower than 10 V), are formed on different substrates, thereby making it possible to take different manufacturing processes for TFTs of different drive voltages. Accordingly, TFT forming processes in the first substrate 50 differ from those in the second substrate 55 so that different semiconductor films can receive different crystallization processes and different gate insulating films can have different thicknesses. As a result, TFTs suited for their respective purposes are obtained.

For instance, an electric characteristic required for the TFTs of the CPU is high mobility and therefore a laser crystallization process or a crystallization process using a metal element that accelerates crystallization, or a combination of these crystallization processes is used for the TFTs on the opposite substrate. On the other hand, the TFTs on the pixel substrate needs high mobility to a certain degree but not so high compared to the CPU.

In the CPU required to operate at high speed, the drive voltage has to be lowered and the gate insulating film has to be thinned accordingly. However, it is difficult for the TFTs used in the pixel portion to lower their drive voltage and thin their gate insulating film because of restrictions on the drive voltage of the display device.

The characteristic required is thus varied among TFTs. The present invention is characterized in that different TFTs are manufactured by different processes and different substrates can have different TFTs.

Although the second electrode is formed on the primary face of the second substrate and the CPU is formed on its secondary face in this embodiment, the second electrode and the CPU may be formed on the same face of the second substrate. In this case, the CPU is connected to the driving circuits by an FPC having conductivity.

The CPU may be placed in the position of the seal agent 509 to function as a spacer since the CPU is as tall as the spacer. In this case, the CPU is formed in a region (side) where the driving circuits are placed and the sealing agent is placed in other regions (other sides) of the substrate. Then the CPU is connected to the driving circuits using a conductive paste or the like.

In the description of this embodiment, a CPU is taken as an example of a logic circuit. However, the logic circuit formed may be one or more circuits chosen out of a register, a decoder, a counter, a frequency divider circuit, a memory, a control circuit, a timing generator (timing generating circuit), an SRAM, a DRAM, an image processing circuit, an interface circuit to communicate with an external device, a graphic accelerator, a mask ROM, and DSP.

Figure 25A:
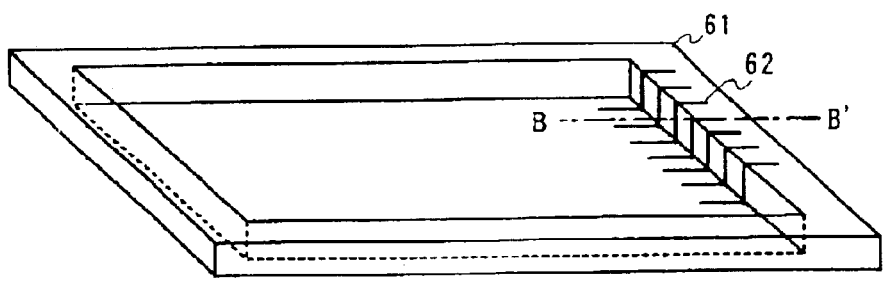
FIGS. 25A and 25B are schematic diagrams of a passive matrix display device.
Figure 25B:
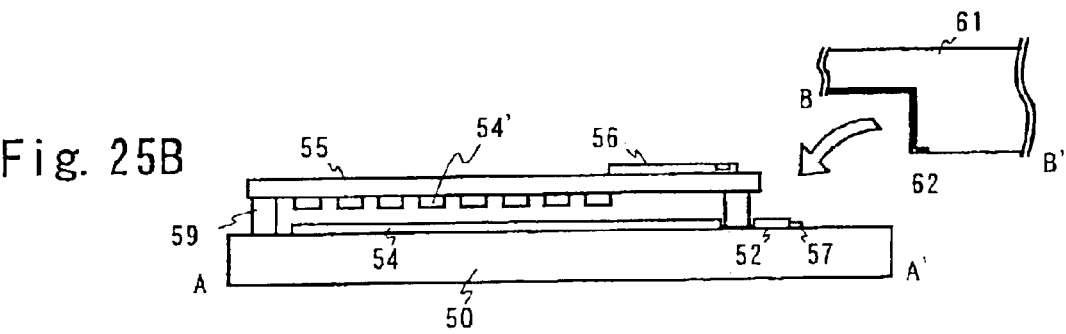

FIGS. 25A and 25B show an example of a connection method different from FIG. 24B where wire bonding is used to connect circuits.

As shown in FIG. 25A, wires 62 are formed in advance in an outer frame 61 of the semiconductor display device (an outer frame generally formed of resin or the like). The wires 62 are lead wires placed in grooves that are formed in the outer frame 61. The interval between the wires is matched with the interval between the electrode pads. Thereafter, the first substrate 51 and the second substrate 55 which are fixed to each other by the seal agent are fit into the outer frame 61 to connect the electrode pads of the driving circuits to the electrode pads of the CPU. Providing the wires in the outer frame like this is easier than connecting the electrode pads by wire bonding and can reduce connection defect. Other connection methods than the one shown in FIGS. 25A and 25B are connecting openings with the electrode pads as in a printed board, a socket-fashion connection method, and a connection method that uses a solder bump formed on the substrate.

As described, a semiconductor device or semiconductor display device of the present invention is characterized in that TFTs are formed on an opposite substrate to build on the opposite substrate a logic circuit which in prior art is formed and mounted on a substrate different from a substrate that constitutes a display unit. As a result, the semiconductor device or semiconductor display device can be reduced in size and, at the same time, mounting of IC chips and the like is greatly simplified to improve the reliability in mounting.

According to the present invention, a semiconductor device can be reduced in size by forming all or some of logic circuits, which in prior art are mounted externally, in a region overlapping a pixel region on a substrate where a reflective electrode is formed. The present invention can also reduce the number of IC chips and the like mounted to a substrate greatly, thereby solving the reliability problem accompanying mounting of IC chips and the like on the substrate.

What is claimed is:

1. A passive matrix display device, comprising:
   a plurality of transistors formed on a first substrate that has an insulating surface;
   a first electrode formed on the transistors;
   a second electrode formed so as to cross the first electrode; and
   a second substrate facing the first substrate and having an insulating surface,
   wherein the plural transistors constitute a signal line driving circuit, a scanning line driving circuit, and a logic circuit.

2. A passive matrix display device according to claim 1, wherein the first electrode is a reflective electrode.

3. A passive matrix display device according to claim 1, wherein the second electrode is a transparent electrode.

4. A passive matrix display device according to claim 1, wherein the plural transistors constitute an SRAM and the read cycle time of the SRAM is 200 nsec or less.

5. A passive matrix display device according to claim 1, wherein the plural transistors constitute a DRAM and the read cycle time of the DRAM is 1 $\mu$sec or less.

6. A passive matrix display device according to claim 1, wherein the plural transistors constitute an image processing circuit and the operation frequency of the image processing circuit is 5 MHz or more.

7. A passive matrix display device according to claim 1, wherein the plural transistors constitute a CPU and the operation frequency of the CPU is 5 MHz or more.

8. A passive matrix display device according to claim 1, wherein the plural transistors constitute a DSP and the operation frequency of the DSP is 5 MHz or more.

9. A passive matrix display device according to claim 1, wherein the first substrate is a plastic substrate, a glass substrate, or a quartz substrate.

10. A passive matrix display device according to claim 1, wherein the second substrate is a plastic substrate, a glass substrate, or a quartz substrate.

11. A passive matrix display device according to claim 1, wherein the transistors are thin film transistors formed on an insulating surface.

12. A passive matrix display device according to claim 11,
   wherein active layers of the thin film transistors have a crystalline semiconductor film, and
   wherein crystal grains that constitute the crystalline semiconductor film are present in one axial direction.

13. A passive matrix display device according to claim 12, wherein the channel direction of the plural TFTs and the one axial direction form an angle of −30° to 30°.

14. A passive matrix display device according to claim 1, wherein the logic circuit is one or more circuits selected from the group consisting of an SRAM, a DRAM, a frame memory, a timing generating circuit, an image processing circuit, a CPU, a DSP, and a mask ROM.

15. A passive matrix display device, comprising:
   a plurality of transistors formed on a first substrate that has an insulating surface;
   a first electrode formed on the transistors;
   a second electrode formed so as to cross the first electrode; and
   a second substrate facing the first substrate and having an insulating surface,
   wherein the plural transistors constitute a signal line driving circuit, a scanning line driving circuit, and a logic circuit,
   wherein the first electrode is connected to the signal line driving circuit or the scanning line driving circuit through an opening formed in the insulating film.

16. A passive matrix display device according to claim 15, wherein the first electrode is a reflective electrode.

17. A passive matrix display device according to claim 15, wherein the second electrode is a transparent electrode.

18. A passive matrix display device according to claim 15, wherein the plural transistors constitute an SRAM and the read cycle time of the SRAM is 200 nsec or less.

19. A passive matrix display device according to claim 15, wherein the plural transistors constitute a DRAM and the read cycle time of the DRAM is 1 $\mu$sec or less.

20. A passive matrix display device according to claim 15, wherein the plural transistors constitute an image processing circuit and the operation frequency of the image processing circuit is 5 MHz or more.

21. A passive matrix display device according to claim 15, wherein the plural transistors constitute a CPU and the operation frequency of the CPU is 5 MHz or more.

22. A passive matrix display device according to claim 15, wherein the plural transistors constitute a DSP and the operation frequency of the DSP is 5 MHz or more.

23. A passive matrix display device according to claim 15, wherein the first substrate is a plastic substrate, a glass substrate, or a quartz substrate.

24. A passive matrix display device according to claim 15, wherein the second substrate is a plastic substrate, a glass substrate, or a quartz substrate.

25. A passive matrix display device according to claim 15, wherein the transistors are thin film transistors formed on an insulating surface.

26. A passive matrix display device according to claim 25,
   wherein active layers of the thin film transistors have a crystalline semiconductor film, and
   wherein crystal grains that constitute the crystalline semiconductor film are present in one axial direction.

27. A passive matrix display device according to claim 26, wherein the channel direction of the plural TFTs and the one axial direction form an angle, of −30° to 30°.

28. A passive matrix display device according to claim 15, wherein the logic circuit is one or more circuits selected from the group consisting of an SRAM, a DRAM, a frame memory, a timing generating circuit, an image processing circuit, a CPU, a DSP, and a mask ROM.

29. A passive matrix display device, comprising:
a plurality of transistors formed on a first substrate that has an insulating surface;
a first electrode formed on the transistors;
a second electrode formed so as to cross the first electrode; and
a second substrate facing the first substrate and having an insulating surface,
wherein the plural transistors constitute a signal line driving circuit, a scanning line driving circuit, and a logic circuit, and
wherein the second electrode is connected to the signal line driving circuit or the scanning line driving circuit through an FPC or a wire.

30. A passive matrix display device according to claim 29, wherein the first electrode is a reflective electrode.

31. A passive matrix display device according to claim 29, wherein the second electrode is a transparent electrode.

32. A passive matrix display device according to claim 29, wherein the plural transistors constitute an SRAM and the read cycle time of the SRAM is 200 nsec or less.

33. A passive matrix display device according to claim 29, wherein the plural transistors constitute a DRAM and the read cycle time of the DRAM is 1 μsec or less.

34. A passive matrix display device according to claim 29, wherein the plural transistors constitute an image processing circuit and the operation frequency of the image processing circuit is 5 MHz or more.

35. A passive matrix display device according to claim 29, wherein the plural transistors constitute a CPU and the operation frequency of the CPU is 5 MHz or more.

36. A passive matrix display device according to claim 29, wherein the plural transistors constitute a DSP and the operation frequency of the DSP is 5 MHz or more.

37. A passive matrix display device according to claim 29, wherein the first substrate is a plastic substrate, a glass substrate, or a quartz substrate.

38. A passive matrix display device according to claim 29, wherein the second substrate is a plastic substrate, a glass substrate, or a quartz substrate.

39. A passive matrix display device according to claim 29, wherein the transistors are thin film transistors formed on an insulating surface.

40. A passive matrix display device according to claim 39,
wherein active layers of the thin film transistors have a crystalline semiconductor film, and
wherein crystal grains that constitute the crystalline semiconductor film are present in one axial direction.

41. A passive matrix display device according to claim 40, wherein the channel direction of the plural TFTs and the one axial direction form an angle of −30° to 30°.

42. A passive matrix display device according to claim 29, wherein the logic circuit is one or more circuits selected from the group consisting of an SRAM, a DRAM, a frame memory, a timing generating circuit, an image processing circuit, a CPU, a DSP, and a mask ROM.

43. A passive matrix display device, comprising:
a first substrate having an insulating surface;
a second substrate facing the first substrate and having an insulating surface;
a signal line driving circuit, a scanning line driving circuit, and a first electrode that are formed on the first substrate, the driving circuits having a plurality of TFTs; and
a logic circuit and a second electrode that are formed on the second substrate.

44. A passive matrix display device according to claim 43, wherein the logic circuit is formed only above the signal line driving circuit or the scanning line driving circuit.

45. A passive matrix display device according to claim 43, wherein the first substrate is a plastic substrate, a glass substrate, or a quartz substrate.

46. A passive matrix display device according to claim 43, wherein the second substrate is a plastic substrate, a glass substrate, or a quartz substrate.

47. A passive matrix display device according to claim 43, wherein the transistors are thin film transistors formed on an insulating surface.

48. A passive matrix display device according to claim 47, wherein active layers of the thin film transistors have a crystalline semiconductor film.

49. A passive matrix display device according to claim 47,
wherein active layers of the thin film transistors have a crystalline semiconductor film, and
wherein the crystalline semiconductor film is obtained by irradiating a semiconductor film with continuous wave laser light while scanning the laser light over the semiconductor film in one direction.

50. A passive matrix display device according to claim 49, wherein the channel length direction of the thin film transistors and the laser light scanning direction form an angle of −30° to 30°.

51. A passive matrix display device according to claim 47,
wherein active layers of the thin film transistors have a crystalline semiconductor film, and
wherein crystal grains that constitute the crystalline semiconductor film are present in one axial direction.

52. A passive matrix display device according to claim 51, wherein the channel direction of the plural TFTs and the one axial direction form an angle of −30° to 30°.

53. A passive matrix display device according to claim 43, wherein the logic circuit is one or more circuits selected from the group consisting of an SRAM, a DRAM, a frame memory, a timing generating circuit, an image processing circuit, a CPU, a DSP, and a mask ROM.

54. A passive matrix display device comprising:
a first substrate having an insulating surface;
an electronic circuit comprising a plurality of thin film transistors formed over said first substrate;
an interlayer insulating film formed over said electronic circuit;
a plurality of first conductive lines formed over said interlayer insulating film and extending in parallel in a first direction;
a plurality of second conductive lines formed over a second substrate and extending in parallel wherein said first substrate is opposed to said second substrate in such a manner that said plurality first conductive lines and said plurality of second conductive lines are in an orthogonal relation to define a plurality of pixels.

55. The passive matrix display device according to claim 54 wherein said electronic circuit is at least one of a driver circuit and a logic circuit.

56. The passive matrix display device according to claim 54 wherein said electronic circuit is at least one of an SRAM, a DRAM, a frame memory, a timing generating circuit, an image processing circuit, a CPU, a DSP, and a mask ROM.

57. The passive matrix display device according to claim 54 wherein said plurality of first conductive lines are reflective and said electronic circuit is provided below said plurality of pixels.

58. The passive matrix display device according to claim 54 wherein said plurality of first conductive lines are operationally connected to the electronic circuit.

* * * * *